(12) United States Patent
Sugimoto

(10) Patent No.: US 6,407,487 B1
(45) Date of Patent: Jun. 18, 2002

(54) SPARK PLUG, ALUMINA INSULATOR FOR SPARK PLUG, AND METHOD OF MANUFACTURING THE SAME

(75) Inventor: Makoto Sugimoto, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/403,727

(22) PCT Filed: Feb. 26, 1999

(86) PCT No.: PCT/JP99/00915

§ 371 (c)(1),
(2), (4) Date: Oct. 26, 1999

(87) PCT Pub. No.: WO99/44266

PCT Pub. Date: Sep. 2, 1999

(30) Foreign Application Priority Data

Feb. 27, 1998 (JP) .......................................... 10-064668

(51) Int. Cl.⁷ ............................................. H01T 13/38
(52) U.S. Cl. ........................ 313/141; 313/143; 313/137
(58) Field of Search .......................... 501/127; 313/118, 313/141, 143, 137

(56) References Cited

U.S. PATENT DOCUMENTS 5,518,974 A * 5/1996 Krahn et al. ................. 501/127

FOREIGN PATENT DOCUMENTS

| JP | 60-176965 | | 9/1985 |
| JP | 63190753 | * | 1/1987 |
| JP | 63-190753 | | 8/1988 |
| JP | 1-212272 | | 8/1989 |
| JP | 6-144922 | | 5/1994 |
| JP | 6-172021 | | 6/1994 |
| JP | 9-223586 | | 8/1997 |
| JP | 9-315849 | | 12/1997 |

* cited by examiner

Primary Examiner—Nimeshkumar D. Patel
Assistant Examiner—Thelma Sheree Clove
(74) Attorney, Agent, or Firm—Sughrue Mion, PLLC

(57) ABSTRACT

In insulator including alumina as a main component, a Na component in the insulator is set in the range of 0.07 to 0.5 wt % as $Na_2O$. While the Na component content is as high as to have conventionally been regarded to be beyond the common sense, with this range of the Na component content, insulation resistance, mechanical strength and the like at high temperature are unexpectedly not reduced and an insulator with performances comparable to those of an insulator from conventional low soda alumina lower in Na component content than the above described range can be obtained. As a result, medium soda alumina and regular soda alumina that are much lower in cost than conventionally used low soda alumina can be used instead of the low soda alumina, so that dramatic reduction in production costs of insulator 2 for a spark plug 100 and in addition, of the spark plug 100 using the insulator 2 are realized.

20 Claims, 11 Drawing Sheets

FIG. 6
(a)
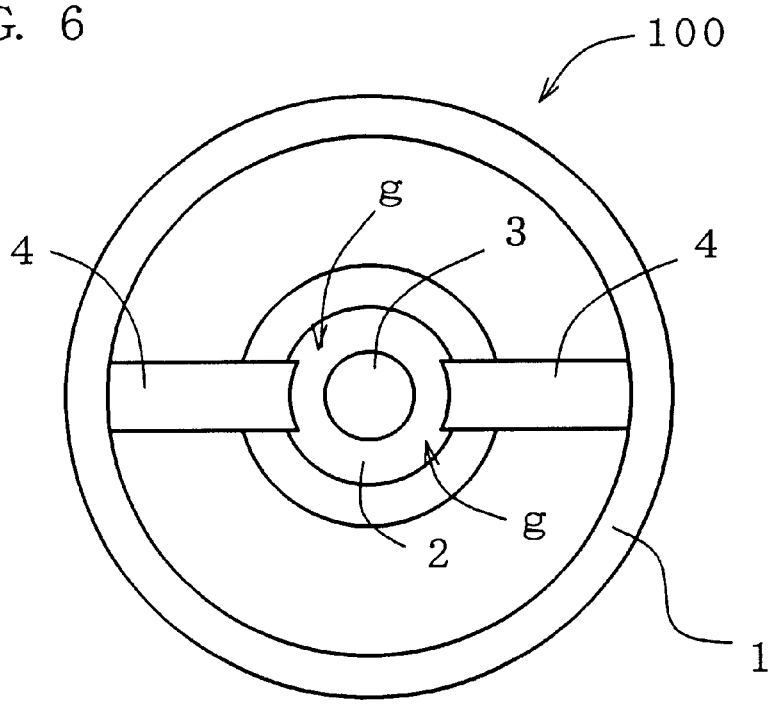
(b)
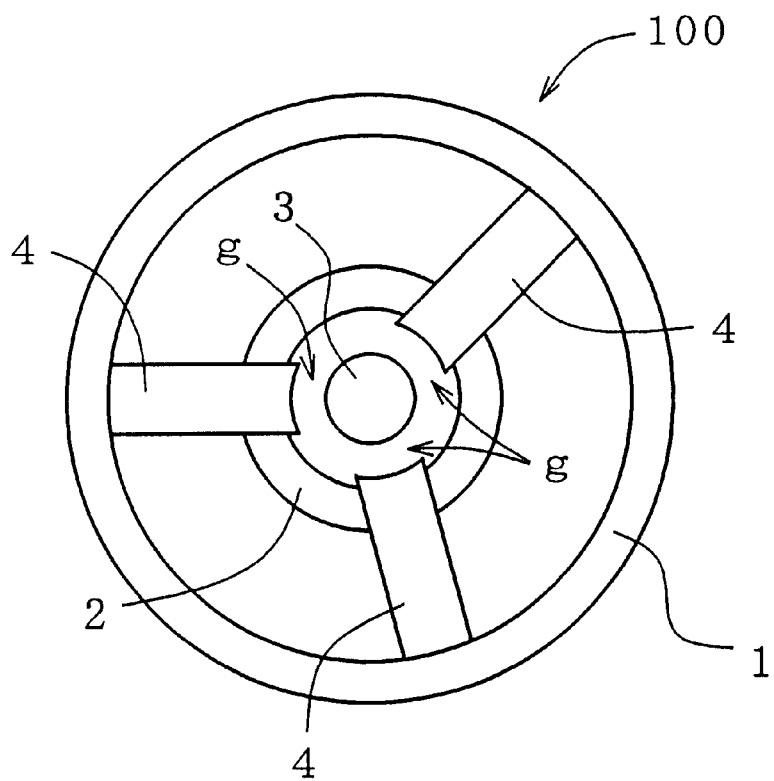

FIG. 9
(a)
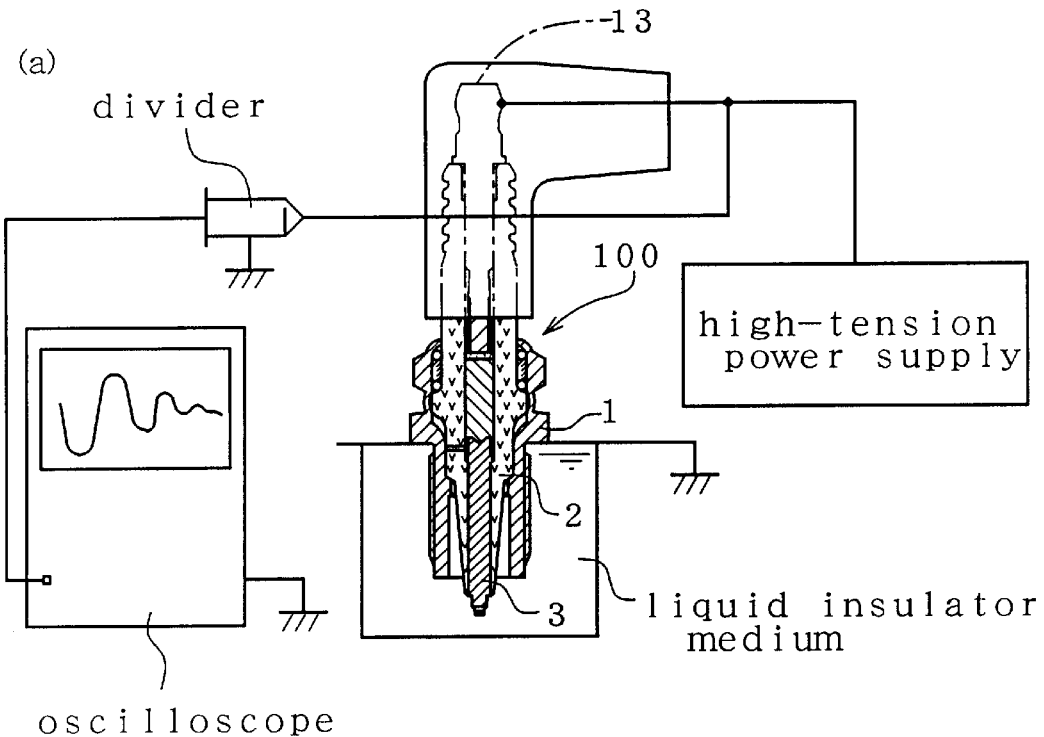
(b)
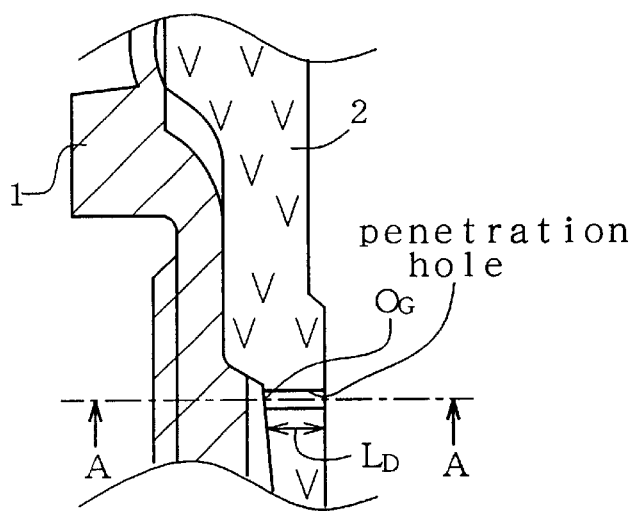
(c)
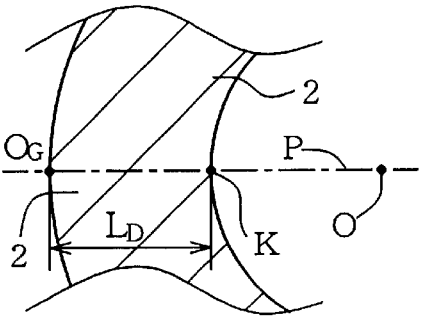

SPARK PLUG, ALUMINA INSULATOR FOR SPARK PLUG, AND METHOD OF MANUFACTURING THE SAME

FIELD OF THE INVENTION

The present invention relates to a spark plug, alumina based insulator used therein and a production process for the same insulator.

BACKGROUND ART

In a spark plug that is used for an internal combustion engine such as an automobile engine, alumina ($Al_2O_3$) based material excellent in heat resistance has been used as insulator therein from old times. Alumina as raw material for such insulator as described above has generally been produced by Bayer process (hereinafter referred to as Bayer alumina).

Bayer process is a process in which alumina is extracted from bauxite in a wet condition, which is naturally occurring aluminum ore, wherein an aqueous solution of caustic soda (NaOH) in a comparatively high concentration is employed as an extracting reagent. Therefore, since thus obtained Bayer alumina includes a Na component (soda component) to a considerable level, a soda removal treatment has often been applied before use on as-needed basis. Alumina is classified according to levels of soda removal into three classes which are shown as follows with respective common names: low alumina soda of a Na component content less than 0.1 wt %, medium soda alumina of a Na component content of the order of 0.1 to 0.2 wt % and regular soda alumina of a Na component content more than the medium soda level, for example of the order of 0.2 wt % or more.

Since a Na component included in alumina shows a nature of high ionic conductance, there arise inconvenience when its content is in excess: insulation resistance, especially insulation resistance at a high temperature of 500° C. or higher is reduced or a mechanical strength at a high temperature is deteriorated. Therefore, alumina based insulator used in a spark plug, which has a Na component at as small a content as possible, has conventionally been considered to be the best of its kind and it has been common sense that a content of the Na component is set at a value as small as 0.05 wt % or less.

It is, as described above, indispensable to use alumina, as raw material, of a low soda family in order to produce alumina based insulator low in Na component content. Alumina of a low soda family is expensive because of a cost increase corresponding to a soda removal process step conducted out of necessity and has an aspect that the alumina is not necessarily desirable from the viewpoint of a raw material cost. In recent years, however, in company with development toward a high powered automobile engine, even insulator for a spark plug with a higher withstand voltage and higher heat resistance has come to be demanded. As a result, the common sense in regard to a low content of a Na component in insulator has increasingly been firmer and the present situation is such that there is established a notion that a cost increase to some extent caused by use of low soda alumina has to be unavoidably accepted.

It is an object of the present invention to provide a spark plug, in which insulator is used that is available at as low a cost as beyond a so far established common sense associated with a Na component content while no inferiority is found in its performance compared with existing insulators, the insulator and a production process for the insulator.

DISCLOSURE OF INVENTION

A spark plug of the present invention comprises: a metal shell arranged outside a center electrode; a ground electrode arranged so as to be opposed to the center electrode, an end of the ground electrode being connected to the metal shell; and an insulator, which resides between the center electrode and the metal shell, and which insulator surrounds the outside of the center electrode, wherein the insulator includes alumina as a main component and further includes a Na component in the range of 0.07 to 0.5 wt % as a value converted into $Na_2O$, and insulation resistance that is measured by passing a current through the insulator between a terminal metal member and the metal shell while the entire spark plug is held at about 500° C. is 200 MΩ or higher.

A production process for alumina based insulator for a spark plug of the present invention in order to produce an insulator used in the above described spark plug is such that alumina powder in use includes a Na component in the range of 0.07 to 0.65 wt % as a value converted into $Na_2O$ and a Na component in the surface layers of particles of the powder is in the range of 0.01 to 0.2 wt % as a value converted into $Na_2O$; the raw material powder including such alumina powder as a main component is formed into a green (a powder compact) prescribed shape of an insulator; and then the green is sintered to obtain an insulator including alumina as a main component and a Na component in the range of 0.07 to 0.5 wt %. It should be noted that the term a Na component content hereinafter means a content of $Na_2O$ equivalent to the Na component content in the following description unless otherwise specified.

The present inventors have conducted a serious study on an Na component content in insulator and have discovered facts that, by adoption of a production process specific to the present, with alumina powder, as raw material, in a high compositional range of a Na component content that has been regarded to be of no common sense: in a concrete manner of description, with alumina powder containing a Na component content in the range of 0.07 to 0.65 wt % as a value converted into $Na_2O$ and a Na component content in the range of 0.01 to 0.2 wt % as a value converted into $Na_2O$ in the surface layers of particles of the powder, there can be obtained insulator whose performance is comparable to a conventional insulator containing a lower Na component content than the above described range of the insulator, while insulation resistance and mechanical strength at high temperature is not reduced, unexpectedly. In a detailed manner of description about the performance, a spark plug constituted of the insulator can secure insulation resistance of 200 MΩ or more which has conventionally been regarded to be impossible to acquire for the Na component content described above, wherein the insulating resistance is measured in such a manner that the entire spark plug is kept at about 500° C. and a current is made to pass through the insulator between a terminal metal member and a metal shell.

FIG. 10 shows an example of a measuring system. Not only a D/C constant-voltage power supply (for example, a power supply voltage 100V) is connected to a terminal metal member 13 side of a plug 100, but a metal shell 1 side is grounded. The spark plug 100 thus outfitted is placed into a heating furnace to heat the spark plug 100 at 500° C. and a current is made to pass through the spark plug 100. For example, a case is considered where current measurement resistor (a resistance value is Rm) is used to measure a value of an applied current Im, then an insulation resistance Rx to be measured can be obtained by a formula $(VS/Im)-Rm$, where VS is an applied voltage to pass the current (in the figure, the applied current value Im is measured form an output of a differential amplifier that amplifies a voltage difference between both ends of the current measurement resistor).

A first constitution of insulator for a spark plug of the present invention is such that the insulator includes alumina as a main component, further includes a Na component in the range of 0.07 to 0.5 wt % as a value converted into $Na_2O$ and has an insulation withstand voltage of 35 kV/mm or higher at 20° C. When alumina powder including a Na component in the range of 0.07 to 0.65 wt % as a value converted into $Na_2O$ and a Na component in the range of 0.01 to 0.2 wt % as a value converted into $Na_2O$ in the surface layers of particles of the powder is used, there can be realized insulator having an insulation withstand voltage comparable with that of a conventional insulator whose Na component content is lower than the above described range in alumina powder of the present invention.

An insulation withstand voltage of the insulator assembled in a spark plug can be measured in the following way: As shown in FIG. 9(a), a ground electrode is removed from a metal shell 1 of a spark plug 100 and an opening side of the metal shell 1 in this state is immersed in liquid insulator medium such as silicon oil and thereby, the insulator 2 and the metal shell 1 are insulated from each other by the liquid insulator medium with which a space interposed between the outer side surface of the former and the inner side surface of the latter is filled. In this state, not only is an AC high voltage or a pulse high voltage applied between the metal shell 1 and a center electrode 3 by a high-tension power supply, but voltage wave forms of the applied voltage (which is dropped at a proper magnification by a voltage divider) are recorded by an oscilloscope or the like.

Then, as shown in FIG. 9(b), not only is a voltage (bulk dielectric breakdown voltage) VD when bulk dielectric breakdown through the insulator 2 arises is read from a voltage wave form, but a value of VD/LD as an insulation withstand voltage is obtained from a thickness LD of the insulator 2 at a penetration hole caused by bulk dielectric breakdown and the bulk dielectric breakdown voltage VD, wherein a position of the penetration hole is defined as a center of an opening thereof formed on an outer surface of the insulator 2. The thickness LD of the insulator 2 at a penetration hole is defined such that, as shown in FIG. 9(c), a section that is perpendicular to a center line O as an axis of the insulator 2 including the center $O_G$ of the opening is taken up for consideration, a straight line P is drawn through the two points $O_G$ and O on the section to obtain an intersection K with an inner side surface of the insulator 2, and then a line segment $KO_G$ is obtained and measured on its length to determine the thickness LD.

Below, further detailed description will be made of a spark plug and alumina based insulator used therein. First of all, by setting a Na component content in the insulator in the above described range, alumina powder as raw material of a Na component content as high as 0.07 to 0.65 wt % as a value converted into $Na_2O$ can be adopted (if the content exceeds 0.65 wt %, a Na component content in the insulator obtained therefrom cannot be suppressed to be equal to or less than 0.5 wt %). As a result, medium soda alumina, regular soda alumina and the like which can be acquired at a much lower cost can be adopted instead of low soda alumina conventionally used, with the result that dramatic reduction in production costs of not only insulator for a spark plug but also a spark plug using the insulator can be realized.

In order to confine a Na component content in the insulator to less than 0.07 wt alumina powder low in Na component content such as low soda alumina has to be used, which makes it impossible to secure superiority over conventional insulator from the viewpoint of raw material cost.

On the other hand, when a Na component content exceeds 0.5 wt % in the insulator, insulation resistance of the insulator is insufficient, which causes a withstand voltage performance required for the insulator for a spark plug not to be satisfied. A Na component content in the insulator is more desirably selected to be in the range of 0.07 to 0.25 wt %. Aluminum powder as raw material of a Na component content in the range of 0.07 to 0.3 wt % as a value converted into $Na_2O$ is desirably used.

As alumina powder used in production of the above described insulator, alumina powder produced by Bayer process can be used. While Bayer process has publicly been known, the process will be outlined for better understanding below: At first, bauxite which is a naturally occurring aluminum ore is pulverized into powder and then the powder is subjected to pressure extraction in an aqueous solution of caustic soda. An alumina component in the ore (for example, gibbsite or boehmite as alumina based ore) is dissolved as sodium aluminate in the solution according to the following chemical reaction formula (1) on the basis of an amphoteric character of Al element and separated from insoluble residue (red sludge) such as $Fe_2O_3$, $SiO_2$ or $TiO_2$.

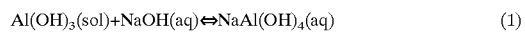

$$Al(OH)_3(sol)+NaOH(aq) \Leftrightarrow NaAl(OH)_4(aq) \qquad (1)$$

While extraction conditions are different according to a kind of alumina based ore, typically, for example, temperature is in the range of 120 to 300° C. and concentration of caustic soda is in the range 130 to 380 g/l. The insoluble residue is filtered out from the solution to separate an extract, the extract is added with seed alumina and a concentration of caustic soda is reduced to a concentration in the range of 90 to 160 g/l. With such reduction in concentration, the extract is subjected to a reverse reaction of the formula 1 at temperature in the range of 35 to 80° C. for a period in the range of 30 to 60 hours to precipitate and deposit aluminum hydroxide in a solid state. Thus obtained aluminum hydroxide is separated from the solution and is further washed, if necessary, and thereafter, the washed hydroxide is calcined to produce Bayer alumina.

The present inventors have further conducted a serious study and found that while alumina power produced by Bayer process contains a Na component in the interior each of powder particles, a surface region of each powder particle has a Na component higher in concentration because of treatment by the caustic soda solution. Such a Na component in the surface regions of the powder particles causes a problem: The Na component in each of the surface regions of the powder particles forms a glassy phase by melting together with sintering aids (additive element component described later) in sintering. The glassy phase is associated with a problem since the phase decreases en electric resistivity due to formation of a solid solution of the Na component and such a solid solution serves as a conductive channel, which causes decrease in insulation resistance and reduction in insulation withstand voltage.

The present inventors have further conducted a serious study in light of such a problem and as a result, have found that alumina powder to be preferably used is one whose particles have a Na component in the range of 0.01 to 0.2 wt % as a value converted into $Na_2O$ in their surface regions. If alumina powder particles having the Na component in the surface regions more than 0.2 wt % is used, there is a chance that the insulator obtained therefrom has the insulation resistance and insulation withstand voltage both short of respective requirements. In order to confine the Na component content in the surface region of each of powder particles (hereinafter referred to as surface Na amount) to less than 0.01 wt %, there are considered two ways, but any of both has a fault: in one way, alumina low in Na component content, such as low soda aluminum, eventually has to be used, or in the other way, alumina powder high in Na component content is used and therefore, a removal process for the Na component in the surface region of each of the powder particles is complex or requires a long time period, which causes superiority over conventional insulator with respect of raw material cost to be lost. In this connection, a Na component content in the particle surface regions are desirably in the range of 0.01 to 0.15 wt %, or more desirably in the range 0.01 to 0.1 wt %.

A Na component content in the surface region of each of powder particles (surface Na amount) means a value measured in the following way: At first, a total content in wt % of a Na component in alumina powder which is an object to be measured is measured by ICP atomic emission spectrometry, a chemical analysis or the like and measurements are converted to values in $Na_2O$, wherein the conversion value is indicated by $W_{Na1}$. Then, 100 g of alumina powder is kept immersed in 100 ml of a distilled water at a constant temperature of 90° C. for 1 hr with no stirring. Thereafter, the alumina powder is separated for recovery from the distilled water and the Na component content in wt % is again measured and the measurement is converted to a value in $Na_2O$, wherein the conversion value is indicated by $W_{Na2}$. Then a value of $W_{Na1} - W_{Na2}$ in wt % is calculated and the value is regarded as a content of the Na component existent in the surface region of each of powder particles.

While Bayer alumina powder is produced by calcining aluminum hydroxide obtained by extraction, a Na component content in the surface of each of powder particles is considerably different according to a production process. For example, when aluminum hydroxide is calcined, a variety of measures are taken so that a Na component liberated from alumina particles is not diffused back to the alumina particle side. As a typical measure, there has been known a process in which chlorine gas is made to flow in an atmosphere of calcination and liberated sodium component is fixed in the form of sodium chloride. However, since, in this process, sodium chloride as a reaction product is remained on the surfaces of alumina particles, therefore even after a water washing process of an ordinary level, the sodium chloride is still continued to be remained at a considerable level. On the other hand, in another measure, aluminum hydroxide particles are calcined in mixture with silica particles coarser than the aluminum hydroxide particles are, thereby, a Na component liberated in the calcination is made to be absorbed by the silica particles and the silica particles are lastly separated off by a sieve or another means. It has well known that a residual amount of the Na component in the surfaces of alumina particles thus treated is considerably decreased. Accordingly, in a case where Bayer alumina powder is used, the alumina powder has to be selected so that not only a total Na component but also the surface Na amount are respectively included in the ranges defined for a production process of the present invention. If the surface Na amount of power particles unavoidably exceeds the defined range described above, it is important that the powder is washed by water (or acid cleaning) on an as-needed basis so that the surface Na amount is adjusted to fall within the above described range and then thus washed powder is used.

An Al component content of the insulator converted to a corresponding equivalent value in $Al_2O_3$ (hereinafter referred to as $W_{Al}$) is preferably adjusted in the range of 85 to 95 wt %. If $W_{Al}$ is less than 85 wt %, high temperature characteristics of a mechanical strength and a withstand voltage of the insulator are sometimes insufficient. The $W_{Al}$ is desirably set to be 90 wt % or more. However, if $W_{Al}$ exceeds 98 wt %, a content of sintering aids is excessively reduced on a relative basis and thereby the insulator after sintering is difficult to be obtained in a highly densified state; for example, if the insulator in a more densified state is tried to be obtained, then temperature increase in sintering cannot be avoided, which entails grain sizes of alumina particles constituting the insulator to grow to be larger with the result of inconvenience such as degradation of a mechanical strength, contrary to expectation. Hence, a $W_{Al}$ is preferably adjusted in content equal to or less than 98 wt %.

Then, a second constitution of an insulator of a spark plug of the present invention is such that the insulator includes alumina as a main component, further includes a Na component in the range of 0.07 to 0.5 wt % as a value converted into $Na_2O$, wherein an Al component is included in the range of 95 to 98 wt % as a value converted into $Al_2O_3$ ($W_{Al}$). The insulator can be obtained with its leveled-up excellency in insulation resistance or withstand voltage characteristics by adjusting $W_{Al}$ in the high alumina compositional range of 95 to 98 wt %, though a Na component in the above described compositional range is included. Furthermore, when alumina powder as raw material with a surface Na amount in the above described range is used, a Na content in a glassy layer is reduced and the insulator with a higher withstand voltage can be realized.

A structure of the insulator of the present invention is constructed of an alumina based matrix phase particles of 99 wt % or more in alumina content, as a main phase, and a glassy phase formed in grain boundary regions of the alumina based matrix phase grains. In this case, when alumina powder with a low surface Na amount is used as described above, a percentage of a Na content $WG_{Na}$ (converted into a value in $Na_2O$) present in the glassy phase of a total Na component content in the insulator can be controlled in the range of 0.4 to 2 wt %, which is advantageous in order to secure an insulation resistance and an insulation withstand voltage and at the same time, is effective for reduction in raw material cost. A third constitution of an insulator of a spark plug of the present invention is such that the insulator includes alumina as a main component, further includes a Na component in the range of 0.07 to 0.5 wt % as $Na_2O$, wherein an Al component is included in the range of 85 to 98 wt % as a value converted into $Al_2O_3$ ($W_{Al}$), wherein a structure of the insulator is constructed of an alumina based matrix phase particles of 99 wt % or more in alumina content, as a main phase, and a glassy phase formed in grain boundary regions of the alumina based matrix phase particles, and a Na component content $WG_{Na}$ present in a glassy phase is in the range of 0.4 to 2 wt %.

If $WG_{Na}$ exceeds 2 wt %, an insulation resistance and an insulation withstand voltage are sometimes both short of respective requirements. In order to reduce $WG_{Na}$ to be less than 0.4 wt %, alumina powder low in a Na component content has to be used and therefore, superiority in raw material cost over conventional insulator cannot be held. It should be noted that the $WG_{Na}$ that is approximately calculated in the following way is adopted in the present specification: A surface of the insulator is polished, a structure of the insulator is observed on the polished surface with a scanning electron microscope (SEM) and a picture of the structure is subjected to image analysis to measure a area ratio of alumina based matrix (corresponding to a volume ratio), which is indicated by γA. Then, an average concentration by weight of a Na component in a glassy phase is identified by publicly known micro-structure analytical methods such as an electron probe micro-analyzer (EPMA), energy dispersive spectrometer (EDS) or wavelength dispersive spectrometer (WDS) and obtained as $NG_{Na}$ after conversion to a value in $Na_2O$. At this point, it is assumed that the insulator is material consisting of an alumina based matrix phase and a glassy phase only and further assumed that the insulator is closely packed in an almost perfect manner by sintering. When an apparent density of the insulator measured a method based on Archimedes' principle or the like is indicated by $\rho 0$ (in $g/cm^3$) and a density of alumina based crystal particle is indicated by $\rho 1$ (=3.97 $g/cm^3$), a weight of a glassy phase MG per unit volume of the insulator is given as follows:

$$MG = \rho 0 - \rho 1 \cdot \gamma A \quad (1)$$

Therefore, $WG_{Na}$ can be calculated by the following formula:

$$WG_{Na} = MG \cdot NG_{Na} \times 100 = (\rho 0 - \rho 1 \cdot \gamma A) \cdot N_{G_{Na}} \times 100 (\text{wt \%}) \quad (2)$$

It should be noted that an average of concentrations $NG_{Na}$ of a Na component in the glassy phase is also preferably set in the range of 0.4 to 2 wt % for the reason similar to the described above.

Then, in a case where insulator of the present invention is produced using Bayer alumina powder, in common Bayer alumina powder, there is included almost none of alkali metal components other than a Na component (hereinafter referred to as non-alkali metal component) except impurities that are unavoidably included in the Bayer alumina powder. Accordingly, when such Bayer alumina powder is used, a total content of non-alkali metal components in the insulator obtained therefrom is equal to or less than 0.05 wt % as oxide as far as there is no intentional addition of such components. Since, of alkali metal components other than a Na component, Li or K has a chance to reduce a withstand voltage performance, it is an advantageous approach to realize a high withstand voltage insulator that Bayer alumina powder with no such components included is used.

A fourth constitution of the insulator of the present invention is such that the insulator contains alumina as a main component, further includes a Na component in the range of 0.07 to 0.5 wt % as a value converted into $Na_2O$ and K and Li components equal to or less than 0.2 wt % in total content respectively as values converted into $K_2O$ and $Li_2O$. When oxide components of Li, K and/or the like is inevitably added for the purpose of adjustment of sintering temperature, it is desirable that a total content of the oxides combined respectively as $K_2O$ and/or $Li_2O$ is confined to 0.2 wt % or less in order to secure a withstand voltage of the insulator.

The insulator of the present invention can contain one or more additive element components selected from the group consisting of Si, Ca, Mg, Ba, Zn, B and Na components at a total content in the range of 0.1 to 15 wt % respectively as values converted into $SiO_2$, CaO, MgO, BaO, ZnO, $B_2O_3$ and $Na_2O$. Raw material powders to produce such an insulator are each prepared by mixing a total of 0.1 to 15 parts by weight of additive element based raw materials including one or more selected from the group consisting of Si, Ca, Mg, Ba, Zn and B respectively as values converted into $SiO_2$, CaO, MgO, BaO, ZnO and $B_2O_3$ into 85 to 98 parts by weight of alumina powder.

As additive element based raw material, for example, oxides (instead, complex oxides are allowed) of Si, Ca, Ba and Zn are used and besides, there can be named a variety of kinds of powder of inorganic raw materials such as hydroxides, carbonates, chlorides, sulfates, nitrates and phosphates. The kinds of inorganic raw material powder are necessary to be each used in a chemical form which can be transformed into oxides by calcination. In a case of a B component, there can be named: di-boron tri-oxide ($B_2O_3$), ortho-boric acid ($H_3BO_3$) and a various kinds of other boric acids, and besides, borates of Al, which is a main component element, and borates of Ca, Ba, Zn and the like.

The above described element components each are molten and produces a liquid phase in the calcination process and function as a sintering aid to accelerate formation of a densified state. If a total content (hereinafter referred to as W1) as the above described oxides is less than 0.1 wt %, the sintered body in a densified state is difficult to be attained and a high temperature mechanical strength and a high temperature withstand voltage performance are both short of respective requirements. On the other hand, if W1 exceeds 15.0 wt %, a high temperature strength of the insulator is deteriorated. Therefore, a total content W1 of additive element components is preferably set in the range of 1 to 15 wt %, or more desirably in the range of 3.0 to 10.0 wt %.

In the insulator of the present invention, there are also more desirable embodiments associated with additive element components in order to sufficiently secure a withstand voltage performance or a mechanical strength at high temperature while maintaining a Na component at a comparatively high concentration. A fourth constitution of the insulator of the present invention in light of this point is such that the insulator includes one or more selected from the group consisting of Si, Ca, Mg, Ba, Zn and B components at a total content of 60 wt % or more respectively as values converted into $SiO_2$, CaO, MgO, BaO, ZnO and $B_2O_3$ of a remaining weight after excluding a weight as $Al_2O_3$ of the Al component from a total weight. With the additive elements added, a more advantage can be enjoyed since a flowability of a glass component that is formed in the sintering is increased, which enables the insulator with smaller defects such as pores to be realized.

The number of pores each having a size equal to or larger than 10 μm that are observed in a sectional structure of an insulator is desirably to be equal to or less than 100 as average counts per 1 $mm^2$ of the section. With such a number of the pores in the insulator, the insulator can secure a better withstand voltage performance at high temperature. At this point, the term a size of a pore is defined as shown in FIG. 8; When two parallel lines A and B are drawn so as to be in contact with an outer peripheral line of a section of a pore and not to cross the outer peripheral line, the maximum distance d between parallel lines A and B is determined, while positions of the parallel lines A and B are geometrically changed relative to the outer peripheral line of the pore.

As one example, a composition can be shown in which the insulator includes one or more selected from the group consisting of Si, Ca and Mg components at a total content of 60 wt % or more respectively as values converted into $SiO_2$, CaO and MgO of a remaining weight after excluding a weight as $Al_2O_3$ of the Al component from a total weight.

On the other hand, a high temperature strength of an insulator can further be increased by mixing a Ba component and a B component into a bulk. A BaO component may preferably be incorporated in the content range of 0.02 to 0.80 wt % as BaO (hereinafter referred to as $W_{BaO}$). If $W_{BaO}$ is less than 0.02 wt %, an effect of BaO incorporation to improve a high temperature strength is not conspicuous. On the other hand, if $W_{BaO}$ exceeds 0.80 wt %, a high temperature strength is deteriorated. $W_{BaO}$ is desirably adjusted to be in the range 0.15 to 0.50 wt %. On the other hand, a B component is preferably included in the range of 0.01 to 0.75 wt % as $B_2O_3$ (hereinafter referred to as $W_{B_2O_3}$). If $W_{B_2O_3}$ is less than 0.01 wt %, an effect of a B component incorporation to improve a high temperature strength is not conspicuous. On the other hand, if $W_{B_2O_3}$ exceeds 0.75 wt %, a high temperature strength is deteriorated. $W_{B_2O_3}$ is desirably adjusted to be in the range 0.15 to 0.50 wt %.

The above described Ba component and B component may be used singly or in combination and when both are simultaneously used, a total content is preferably in the range of 0.2 to 1.2 wt % as oxides described above.

A bending strength of insulator of the present invention is preferably secured to be 350 MPa or more. If a bending strength is less than 350 MPa, a breakdown or the like due to shortage of strength is apt to take place when a spark plug using such an insulator is mounted to a cylinder head at a holding section. The bending strength is desirably to be 400 MPa or more. Incidentally, the term a bending strength means a three point bending strength (a span length 20 mm) measured at room temperature in conformance with a method described in JIS R1601 (1981) (Testing method for flexural strength (modulus of rapture) of high performance ceramics).

In order to make an additive element component function effectively as a sintering aid, it is important to produce a glassy phase good in flowability neither too much not too less at a prescribed sintering temperature that is set to lower than that of $Al_2O_3$. It is more often effective when several kinds of additive components are mixed in use than when the additive components is singly used. For example, when first additive element components of the above five kinds are all in the respective forms of oxides, the additive element components in alumina powder before sintering desirably include a Si component in the range of 1.50 to 5.00 wt % as a value converted into $SiO_2$, a Ca component in the range of 1.20 to 4.00 wt % as a value converted into CaO, a Mg component in the range of 0.05 to 0.17 wt % as a value converted into MgO, a Ba component in the range of 0.15 to 0.50 wt % as a value converted into BaO and a B component in the range of 0.15 to 0.50 wt % as a value converted into $B_2O_3$.

Together with the additive element components, one or more element components selected from the group consisting of Sc, V, Mn, Fe, Co, and Zn can be included in the insulator as auxiliary additive element components at a total content in the range of 0.1 to 2.5 wt % (desirably in the range of 0.2 to 0.5 wt %) as respective oxides. With such auxiliary additive element components in use, an effect to improve withstand voltage performance characteristics at high temperature is especially exerted. Of the auxiliary additive element components, a Mn component exerts an effect to improve withstand voltage performance characteristics especially in a conspicuous manner and preferred to be used in working of the present invention.

While an effect to improve withstand voltage characteristics can also be expected when a Mn component (or MnO) is singly used, the effect can further be conspicuous by adding a Cr component (or $Cr_2O_3$). In this case, when a Mn component content as a value converted into MnO is indicated by $W_{Mn}$ in wt % and a Cr component content as a value converted into $Cr_2O_3$ is indicated by $W_{Cr}$ in wt %, it is preferred that Mn and Cr components are mixed so that $W_{Mn}/W_{Cr}$ is in the range 0.1 to 10.0. If a value is outside the range of $W_{Mn}/W_{Cr}$, the above described double addition effect is not necessarily conspicuous. Further, when only Mn and Cr components are used as auxiliary components, it is preferred to adjust $W_{Mn}+W_{Cr}$ is in the range of 1.2 to 2.5 wt %, or desirably in the range of 0.2 to 0.5 wt %.

According to a study of the present inventors, it is found that when Mn and Cr components are simultaneously added, a Mn—Al based complex oxide phase (for example Mn—Al based spinel phase) of a high melting point is formed in the insulator. While a glassy phase caused by a sintering aid is formed in a surrounding manner around an alumina based matrix phase in the insulator, it is said that the glassy phase is generally higher in conductivity than the matrix phase and serves as a conductive route for current with ease when breakdown in insulator occurs. However, it is considered that an insulator of the present invention in which the Mn and Cr components are simultaneously added has a state in which the complex oxide phase of high melting point is dispersed in the glassy phase and the conductive route is disconnected or made to go round by the complex oxide phase and thereby, a withstand voltage in dielectric breakdown is increased.

While the additive element components and the auxiliary additive element components are considered to be mainly contained in the chemical forms of oxides, in many cases existing forms of oxides cannot directly be identified for reasons such as formation of an amorphous glassy phase. In this case, if a total content of the additive element components is in the ranges expressed in oxides, the insulator is regarded to fall in the scope of the present invention. It can be confirmed by the following three methods, singly or in combination, whether or not an Al component and an additive element component are included in a insulator:

(1) By X-ray diffraction, it is confirmed whether or not a diffraction pattern that reflects a crystal structure of a particular oxide can be attained.

(2) When a compositional analysis in a section of a material specimen is conducted by publicly known micro-structure analytical methods such as EPMA, EDS or WDS, it is confirmed whether or not an Al component or an additive element component and an oxygen component are simultaneously detected. If simultaneously detected, it is regarded that the Al component or the additive element component is present in the form of an oxide.

(3) The number of valencies of an atom or an ion of an Al component or an additive element component is analyzed by publicly known methods such as X-ray photoelectron spectroscopy (XPS), Auger electron spectroscopy (AES). If the components are present in the forms of oxides, the valency number is measured as a positive number.

An insulator of a spark plug of the present invention is produced in such a manner that, as described above, raw material powder is formed into a green with a prescribed shape of an insulator and the green is sintered. In this case, particles of alumina powder serving as a main component of raw material powder are preferably in the range of 1 to 5 µm as average particle diameter. If the average size exceeds 5 µm, a considerably high temperature is required in order to sufficiently advance a densification of a sintered body. However, in some instances, even if a sintering temperature is considerably set high, the densification of the sintered body is not advanced up to a sufficiently high level and thereby, a high temperature strength of the insulator is short of a required level and an insulation withstand voltage is insufficient. Alumina powder with particles in the range of 1 to 3 µm is more desirably used.

In this case, it is preferred that an average size of crystal grains in an alumina based matrix phase in the green is preferably in the range of 2 to 20 μm (or desirably in the range of 5 to 10 μm). The term a crystal grain's diameter here is defined such that, in conformation with the way to determine a pore size shown in FIG. 8 and with reference to FIG. 8, when two parallel lines A and B are drawn so as to be in contact with an outer peripheral line of a crystal grain that is observed on a polished surface of the insulator and not to cross the outer peripheral line, the maximum distance d between parallel lines A and B is determined, while positions of the parallel lines A and B are geometrically changed relative to the outer peripheral line of the crystal grain and the term an average grain diameter means an average of grain diameters of many crystal grains measured in this way.

Now, alumina powder of a Na content as high as of 0.07 to 0.65 wt % is used in raw material for production of an alumina based insulator of the present invention. The present inventors have been a serious study and have found facts that the raw material using alumina powder of such a high Na content as this is resulted in a green more fragile than that in a case of alumina powder of a low Na content and for example, in press forming, defects such as cracks and edge collapses occur in a green and thereby a forming performance is not necessarily good.

Why alumina powder of a high Na content such as medium soda alumina and regular alumina have not been used in an insulator for a spark plug is naturally considered to be, as a main reason, that reduction in insulation resistance and mechanical strength of an insulator obtained, as described above, is too much worried about, which forces it be of common sense to use low soda alumina. However, a problem of reduction in production yield due to poor forming performance on the raw material powder is imagined to be paralleled to the problem caused by raw material powder with a high Na component content, as a great obstacle for industrialization.

The present inventors have further conducted a serious study in light of such a problem, completed a series of production processes that will be described below in order to improve forming performance of raw material powder and thereby, established processes for industrially providing alumina based insulator for a spark plug of the present invention. Below, detailed description will be made of the processes.

Main features of a process described above are that not only is a binder in a prescribed amount mixed in raw material powder to prepare preform-use powder but a proper acidic component is added to the preform-use powder to adjust a pH value of the preform-use powder so as to be lowered, thereafter, the preform-use powder after the pH adjustment is subjected to forming to produce a green and then the green is sintered to obtain an insulator.

It is found by the present inventors that much of a Na component originated from alumina powder in the preform-use powder is existent in the forms of a strongly basic Na compound such as $Na_2O_3$ or NaOH and thereby, when a pH value of the preform-use powder is shifted toward a basic region side, a forming performance of the powder is deteriorated. According to the above described process, the pH thus shifted to the basic side is lowered to a value in the proper range by adding the acidic component, which greatly improves the forming performance of the preform-use powder and thereby, defects such as cracks and edge collapses are conspicuously suppressed from occurring, so that a yield of production can be improved by a great margin.

In this case, the pH of the preform-use powder is preferably adjusted in the range of 6 to 10. If a value of the pH exceeds 10 or is lowered to less than 6, in any of the cases, the forming performance of the preform-use powder is deteriorated, which leads to reduction of a production yield. The pH is more desirably adjusted in the range of 7 to 9.

As acidic components, there can be used one or more selected from the group consisting of inorganic acids such as boric acid, colloidal silica, carbonic acid and phosphoric acid; organic acids such as citric acid, oxalic acid, tartaric acid and acetic acid; and a salt of a weak base and a strong acid such as ammonium sulfate or ammonium nitrate. For example, when a boric acid (for example ortho-boric acid) is used, a B component in the acid is incorporated into the insulator and an effect to improve a high temperature strength of the insulator can also be expected as described.

Preform-use powder for alumina based insulator for a spark plug is generally prepared by mixing a flux mainly composed of water into raw material powder to form slurry, in which case, a hydrophilic binder is used. However, a problem arises since a forming performance of a preform-use powder mixed with a hydrophilic binder is especially sensitive to a change in pH and as the pH is increased to the basic side region, a forming performance is rapidly deteriorated. The reason why is estimated that many of hydrophilic binders produces a caking property mainly due to a hydrogen bond between polar molecules and as the pH is higher, the hydrogen bond is hindered by actions of basic ions and thereby a forming performance is deteriorated. Any way, by adding an acidic component, a value of the pH is corrected downward and a forming performance of preform-use powder in which a hydrophilic binder is included is improved in an extremely effective manner and as a result, a production yield can be increased.

In the mean time, as hydrophilic binders in use, there can be named: polyvinyl alcohol (PVA), dextrin, polyvinyl pyloridone, starch, carboxymethyl-cellulose alkaline salt (for example, carboxylmethylcellulose sodium (CMC)) and water soluble acrylic resin (for example, polyacrylic acid salt based resin).

The above described process can be performed through the following steps in a concrete manner of description: That is, a water based solvent and a hydrophilic binder in a prescribed amount are blended to raw material powder (including alumina powder), and the flux and the powder are mixed with each other to form slurry and on the other hand, an acidic component is added to the slurry to adjust a pH value of the slurry so as to be in the range of 6 to 10 (desirably in the range of 7 to 9). The slurry is jet-atomized and dried to produce granules of the preform-use powder and the granules are subjected to press forming to obtain a green. A preferred press forming method is a cold isostatic press (CIP) and especially a more preferred press forming method is a rubber press forming method in which a rubber mold is used, from the view point of production with high efficiency and high yield of a long, narrow insulator for a spark plug.

In this case, it is desirable that 100 parts by wt of granules is added with 0.5 to 0 parts by wt (desirably 0.7 to 1.3 parts by wt) of water so that breaking of the granules into powder is accelerated during the press forming, and after the addition of water, the granules are subjected to press forming. At this point, when the pH adjustment through the addition of an acidic component to the granules is not conducted, by the addition of water a strongly basic Na compound such as $Na_2O_3$ and NaOH included in alumina powder is ionized to produce a basic ion, which adversely works so as to suppress a function of a hydrophilic binder with the result that forming performance is deteriorated with ease. However, by pH adjustment through the addition of an acidic component, the forming can be performed with no problem even if water is added to the granules.

In the mean time, a spark plug of the present invention can be of a structure having an ignition portion, which provides a spark discharge gap, and which is fast held by one of a center electrode and a ground electrode. In this case, the ignition portion can be made mainly of a noble metal alloy composed of one or more selected from the group consisting of Ir, Pt and Rh as a main component or components. With such alloy, even when the spark plug is applied in a high powered internal combustion engine, durability of the ignition portion can be improved to a great extent. For example, in a case where a Pt based alloy is used, Pt—Ni alloy (for example, Pt-1 to 30 wt % Ni alloy) can preferably be used. As alloy of Ir as a main component, the following alloy can be adopted, for example.

(1) An alloy composed mainly of Ir that contains 3 to 50 wt % Rh (50 wt % is not included) is used. With the alloy in use, consumption of the ignition portion caused by oxidation/volatilization of an Ir component at high temperature is effectively suppressed, which is resulted in realization of a spark plug excellent in durability.

If a Rh content in the alloy is less than 3 wt %, a suppression effect of oxidation/volatilization of Ir is insufficient and thereby consumption of the ignition portion becomes easy, so that the durability of a spark plug is reduced. On the other hand, if a Rh content is equal to or more than 50 wt %, a melting point of the alloy is lowered and the durability of the plug is reduced as well. As can be clear from the above description, a content of Rh is preferably adjusted in the above described range and the content is desirably in the range of 7 to 30 wt %, more desirably in the range of 15 to 25%, and most desirably in the range of 18 to 22 wt %.

(2) An alloy composed mainly of Ir that contains 1 to 20 wt % of Pt is used. With the alloy in use, consumption of the ignition portion caused by oxidation/volatilization of an Ir component at high temperature is effectively suppressed, which is resulted in realization of a spark plug excellent in durability. If a Pt content in the alloy is less than 1 wt %, a suppression effect of oxidation/volatilization of Ir is insufficient and thereby consumption of the ignition portion becomes easy, so that the durability of a spark plug is reduced. On the other hand, if a Pt content is equal to or more than 20 wt %, a melting point of the alloy is lowered and the durability of the plug is reduced as well.

(3) An alloy composed mainly of Ir that contains 0.1 to 35 wt % Rh and further 0.1 to 17 wt % Ru is used. With the alloy in use, consumption of the ignition portion caused by oxidation/volatilization of an Ir component at high temperature is effectively suppressed, which is resulted in realization of a spark plug excellent in durability. if a Rh content in the alloy is less than 0.1 wt %, a suppression effect of oxidation/volatilization of Ir is insufficient and thereby consumption of the ignition portion becomes easy, so that the durability of a spark plug is reduced. On the other hand, if a Rh content is more than 35 wt %, a melting point of the alloy is lowered and resistance to spark consumption of the plug is reduced, which makes it impossible to secure the durability of a spark plug. Hence, a content of Rh is adjusted in the above described range.

On the other hand, if a Ru content is less than 0.1 wt %, an effect of addition of elements to suppress consumption of oxidation/volatilization of Ir is insufficient. If a Ru content exceeds 17 wt %, the ignition section is, contrary to expectation, apt to be affected by more of spark consumption and as a result, the durability of the plug cannot be secured. Hence, a Ru content is adjusted in the above described range, desirably in the range of 0.1 to 13 wt % and more desirably in the range of 0.5 to 10 wt %.

One of reasons by which resistance to consumption of the ignition portion is improved by addition of Ru in the alloy is guessed that for example, by addition of the component, an oxide layer stable and dense at high temperature is formed on alloy surface and thereby Ir oxide as a single material which is very easy to be vaporized is fixed in the oxide layer. It is further conjectured that the oxide film works as a kind of passive film and suppresses progress in oxidation of an Ir component. Since, in a condition of no addition of Rh, resistance to oxidation/volatilization at high temperature of the alloy is not much improved even with the addition of Ru, it is considered that the oxide film is an Ir—Ru—Rh based complex oxide or the like oxide and such an oxide is higher in density or adherence to an alloy surface than an Ir—Ru based oxide.

If a total content of Ru is excessively increased, it is conjectured that spark consumption of Ir oxide progresses in the following mechanism rather than by vaporization: A density of the oxide layer formed and adherence thereof to an alloy surface is reduced and such a phenomenon is conspicuous when the total content exceeds 17 wt %. When a shock of spark discharge is repeated in a spark plug, it is imagined that the oxide film formed is easy to be separated from the alloy surface and thereby, a new metal surface is exposed to facilitate spark consumption.

By the addition of Ru, the following important effect can additionally be achieved: That is, by the addition of Ru, even if a Rh content is greatly decreased, consumption resistance can sufficiently be secured and a high performance spark plug can be constructed at a low cost compared with a case where an Ir—Rh binary alloy is adopted. In this case, a Rh content is preferably in the range of 0.1 to 3 wt %.

(4) An alloy composed mainly of Ir that contains at least one of Pt, Re and Pd in the range of 1 to 30 wt % and besides, Ru in the range of 1 to 30 wt % is used. When the ignition portion is constituted of an alloy including Ir as a main component and further Pt, Re or Pd in the above described range, not only is consumption due to oxidation/volatilization of an Ir component at high temperature effectively suppressed but also its workability in mechanical processing is dramatically improved by additional inclusion of Rh in the above described range. A chip can be a metal piece formed by applying prescribed mechanical processing to an alloy mass of a prescribed composition obtained by mixing/melting of raw material, wherein the term mechanical processing means one or more selected from the group consisting of rolling, forging, shaping by cutting, dividing by cutting and blanking.

If a Rh content is less than 1 wt %, an effect to improve workability of the alloy in the mechanical processing cannot sufficiently be achieved and for example, breaking, cracking and the like are apt to arise during the mechanical processing, leading to reduction of a yield rate of the effectively used in a product to starting material. When a chip is produced by hot blanking or the like, consumption or damage of a tool such as blanking edge is easy to occur, thereby resulting in reduction in production efficiency. On the other hand, if a Rh content exceeds 49 wt %, a melting point of an alloy is lowered, which entails decrease in durability of a plug. Therefore, a Rh content is preferably adjusted in the range of 2 to 20 wt % and especially, in a case where a total content of Pd and/or Pt is equal to or more than 5 wt %, an alloy becomes further fragile and therefore in this case, unless Rh is added in a content equal to or more than a value, a chip production by mechanical processing is extremely difficult. In this case, additive Rh is required to be 2 wt % or more in the broadest sense, but desirably 5 wt % or more, and more desirably 10 wt % or more. It should be noted that in a case of a Rh content equal to or more than 3 wt %, Rh exerts not only an effect to improve the workability in the mechanical processing, but, though sometimes, an effect to suppress oxidation/volatilization of an Ir component at high temperature.

If a total content of Pt and/or Pd is less than 1 wt %, an effect to suppress oxidation/volatilization of Ir becomes insufficient and a chip is easy to be consumed, which entails reduction in the durability. On the other hand, if the content exceeds 30 wt %, a problem arises, since a melting point of the alloy is lowered and the durability of the plug is likewise decreased (for example, in a case where Pd is singly used) or an effect to suppress consumption of a chip cannot be as high as expected in consideration of increase in material cost due to increase in content of expensive Pt and/or Pd. As can be seen from the above description, a total content of Pt and/or Pd is preferably adjusted in the above described range and desirably in the range of 3 to 20 wt %.

Besides, in any of materials described in (1) to (3), a material constituting a chip can contain oxides (including double or multiple oxides) of a metal or metals belonging to the group 3A (so-called rare earth elements) and the group 4A (Ti, Zr and Hf) of the periodic table of the elements in the range of 0.1 to 15 wt %. With the additional inclusion, consumption of an Ir oxide through oxidation/volatilization thereof is further effectively suppressed. If a total content of the oxides is less than 0.1 wt %, an effect to prevent oxidation/volatilization of Ir cannot sufficiently be attained. On the other hand, if a total content of the oxides exceeds 15 wt %, thermal shock resistance of a chip is reduced and, for example, when the chip is fixed to an electrode by welding or the like, inconveniences such as cracking sometimes occurs. While as the above described oxides, $Y_2O_3$ is preferably used, it is noteworthy in addition that $La_2O_3$, $ThO_2$, $ZrO_2$ and the like can preferably be used.

BRIEF DESCRIPTION OF THE DRAWINGS

FIG. 6 is a plan view of FIG. 5 and its alternate example;

FIG. 9 is a diagram and enlarged sectional view illustrating a measuring method for an insulation withstand voltage;

BEST MODE TO CARRY OUT THE INVENTION

Below, description will be made of embodiments of the present invention with reference to the accompanying drawings.

Figure 1:
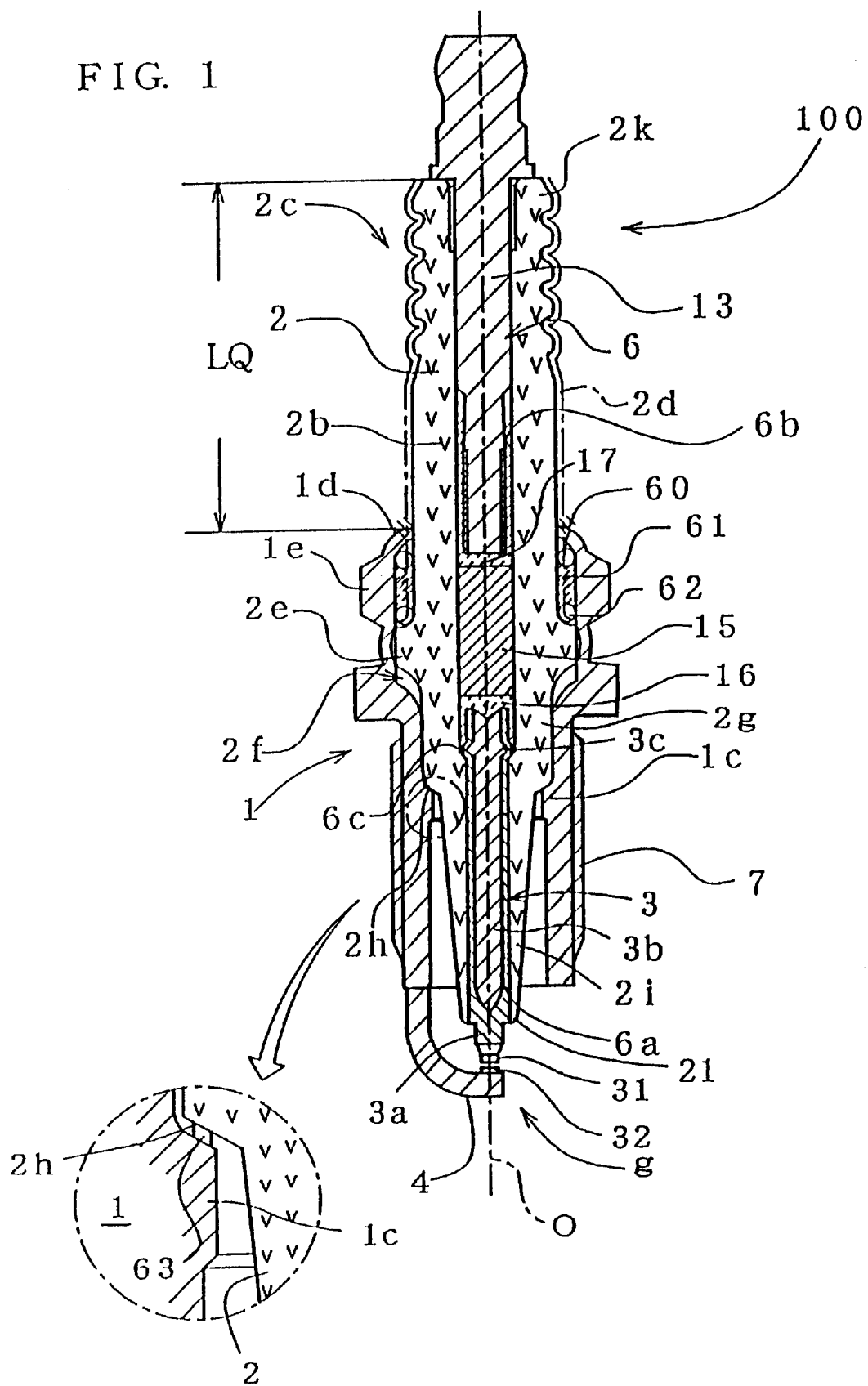
FIG. 1 is a sectional front view showing the whole of an example of a spark plug of the present invention.
Figure 2:
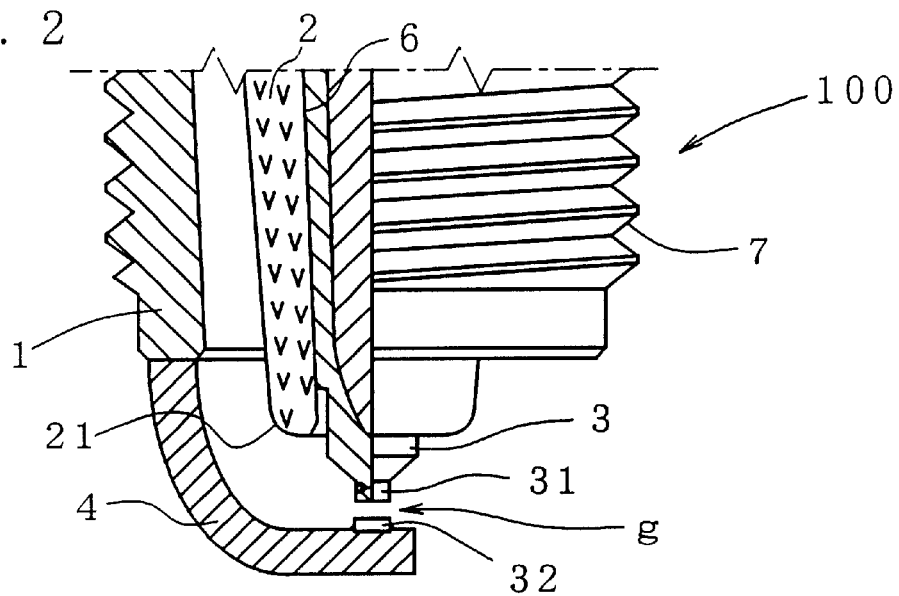
FIG. 2 is a partly sectional front view of a main part of FIG. 1.

A spark plug 100 as an example of the present invention shown in FIGS. 1 and 2 comprises: a metal shell 1 in a cylindrical shape; an insulator 2 that is fittingly inserted within the metal shell 1 so that a fore-end 21 thereof projects; a center electrode 3 that is provided in the interior of the insulator 2 in a state in which a first ignition portion 31 formed at a top of the fore-end of the center electrode projects; and a round electrode 4, one end of which is welded to the metal shell 1, and which is arranged so as to be opposed to the fore-end of the center electrode. A second ignition portion 32 is formed on the ground electrode 4 so as to be opposed to the first ignition portion 31 and a spark discharge gap g is formed between the opposed ignition sections 31 and 32.

A through hole is formed along an axial direction of the insulator 2 and a metal terminal 13 is inserted and fixed from one end side thereof while the center electrode 3 is inserted and fixed from the other end side likewise. A resistor 15 is disposed between the metal terminal 13 and the center electrode 3 in the through hole 6. Both ends of the resistor 15 are electrically connected with the center electrode 3 and the metal terminal 13 respectively by way of conductive glass seal layers 16 and 17 interposed therebetween. The resistor 15 is formed in such a manner that glass powder and conductive material powder (and, as needs come up, ceramic powder other than glass powder) are mixed with each other and the mixed powder is sintered by a hot press or the like to form a resistor composition mass. The metal terminal 13 and the center electrode 3 may be integrated as one body with one layer conductive glass seal layer while the resistor 15 is omitted.

The insulator 2 has the through hole 6 in the interior thereof to fittingly insert the center electrode 3 therethrough along an axial line thereof and the whole structure is constituted as an insulator of the present invention. That is, the insulator 2 is constituted as an alumina based ceramic sintered body that, as a main component, comprises alumina, wherein an Al component amounts to a content in the range of 85 to 89 wt % (desirably in the range of 90 to 98 wt %) as a value converted into $Al_2O_3$, and further a Na component amounting to a content in the range of 0.07 to 0.5 wt % (desirably in the range of 0.07 to 0.25 wt %).

As a more concrete composition, the following is exemplified:

a Si component in the range of 1.50 to 5.00 wt % as a value converted into $SiO_2$;

a Ca component in the range of 1.20 to 4.00 wt % as a value converted into CaO;

a Mg component in the range of 0.05 to 0.17 wt % as a value converted into MgO;

a Ba component in the range of 0.15 to 0.50 wt % as a value converted into BaO; and a B component in the range of 0.15 to 0.50 wt % as a value converted into $B_2O_3$.

As shown in FIG. 1, the protrusion 2e is formed in the shape of a flange extending outwardly around the periphery of the insulator 2 at about the middle point of its length. The insulator 2 is constructed of the forward side that is constituted of the side closer to the fore-end of the center electrode 3 (FIG. 1) from the protrusion 2e with the protrusion 2e as a boundary and the backward side that is constituted of the part contrary to the forward side. The backward side formed with a diameter smaller than that of the protrusion 2e constitutes a body section 2b, while the forward side is constructed of a first stem section 2g smaller in diameter than that of the protrusion 2e and a second stem section 2i smaller in diameter than that of the first stem section 2g in the written order toward the fore-end. A glaze 2d is applied on the outside surface of the main body section 2b and the outer surface in the back end portion next to the glazed surface is formed as a corrugation 2c. An outer side surface of the first stem section 2g is formed in an almost cylindrical shape and an outer side surface of the second stem section 2i is formed in a conical shape tapering toward the fore-end.

A diameter of a section of the center electrode 3 is smaller than that of the resistor 15. The through hole 6 of the insulator 2 is constructed of a first part 6a in an almost cylindrical shape through which the center electrode 3 is inserted and a second part 6b in an almost cylindrical shape of a diameter larger than that of the first part, which is disposed in the back side (the upper side in the figure) of the first part 6a. As shown in FIG. 1, the metal terminal 13 and the resistor are accommodated in the second part 6b and the center electrode 3 is inserted through the interior of the first part 6a. An electrode fixing protrusion 3c is formed at the rear-end portion of the center electrode 3 while protruding outwardly from the outer side surface of the rear-end portion. The first part 6a and second part 6b of the through hole 6 is connected to each other in the interior of the first stem section 2g and the protrusion resting surface 6c is formed in a tapered surface or a concave surface at the connecting position of both parts 6a and 6b to receive the electrode fixing protrusion 3c the center electrode 3.

An outer side surface of the connecting section 2h between the first stem section 2g and the second stem section 2i are formed in the shape of a step surface and the step surface works as a stopper for being extracted in the axial direction by engaging with a annular step section 1c that is formed on an inner side surface of the metal shell 1 as a metal shell side engaging section with a ring-like plate packing 63 interposed therebetween. On the other hand, in a space between the inner side surface of the backward side opening section of the metal shell 1 and the outer side surface of the insulator 2, there are provided: a wire packing ring 62 which engages with a rear side peripheral surface of the protrusion 2e; a filler layer 61 of talc or the like following the wire packing ring 62 in the backward direction; and a wire packing ring 60 further following the filler layer 62 in the backward direction. The insulator 2 is pushed to the forward side and, in the state, the opening brim of the metal shell 1 of the metal shell 1 is caulked inwardly while the opening brim of the metal shell 1 is opposed to the packing ring 60 to form a caulking section 1d, so that the metal shell 1 is fixed to the insulator 2.

FIGS. 4(a) and 4(b) shows examples of the insulator 2. Dimensions of parts of insulators are exemplified below:

a total length L1 in the range of 30 to 75 mm;

a length L2 of the first stem section 2g in the range of 0 to 30 mm (wherein the connection section 2f with the engaging protrusion 2e is not included but the connection section with the second stem section 2i is included);

a length L3 of the second stem section 2i in the range of 2 to 27 mm;

an outer diameter D1 of the main body section 2b in the range of 9 to 13 mm;

an outer diameter D2 of the engaging protrusion 2e in the range of 11 to 16 mm;

an outer diameter D3 of the first stem section 2g in the range of 5 to 11 mm;

an outer diameter D4 of the base end portion of the second stem section 2i in the range of 3 to 8 mm;

an outer diameter D5 of the fore-end portion of the second stem section 2i in the range of 2.5 to 7 mm (wherein when an outer periphery of the fore-end surface is rounded or chamfered, an outer diameter at a base end position of the rounded part or chamfered part in a section including the center line O as an axis is measured);

an inner diameter D6 of the second part 6b of the through hole 6 in the range of 2 to 5 mm;

an inner diameter D7 of the first part 6a of the through hole 6 in the range of 1 to 3.5 mm;

a thickness t1 of the first stem section 2g in the range of 0.5 mm to 4.5 mm;

a thickness t2 of the base end portion of the second stem section 2i in the range of 0.3 to 3.5 mm (a value in a direction perpendicular to the center line O as an axis); and a thickness t3 of the fore-end portion of the second stem section 2i in the range of 0.2 to 3 mm (a value in a direction perpendicular to the central line O as an axis, however, when an outer periphery of the fore-end surface is rounded or chamfered, an outer diameter at a base end position of the rounded part or chamfered part in a section including the center line O as an axis is measured); and an average thickness tA=t1+t2/2 of the second stem section 2i in the range of 0.25 to 3.25 mm.

In FIG. 1, a length $L_Q$ of a portion 2k projecting toward the backward side of the metal shell 1 of the insulator 2 is in the range of 23 to 27 mm (for example, of the order of 25 mm). A length $L_P$ measured along a sectional outline from a position corresponding to the rear end brim of the metal shell 1 through the corrugation 2c to the rear end brim of the insulator 2 is in the range of 26 to 32 mm (for example, of the order of 29 mm).

The dimensions of the respective parts of an insulator 2 shown in FIG. 4(a) are, for example, such that L1=about 60 mm, L2=about 10 mm, L3=about 14 mm, D1=about 11 mm, D2=about 13 mm, D3=about 7.3 mm, D4=5.3 mm, D5=4.3 mm, D6=3.9 mm, D7=2.6 mm, t1=3.3 mm, t2=1.4 mm, t3=0.9 mm and tA=1.2 mm.

The insulator 2 shown in FIG. 4(b) has slightly larger outer diameters of the first shaft section 2g and the second shaft section 2i than those in the case shown in FIG. 4(a). The dimensions of the respective parts are, for example, such that L1=about 60 mm, L2=about 10 mm, L3=about 14 mm, D1=about 11 mm, D2=about 13 mm, D3=about 9.2 mm, D4=6.9 mm, D5=5.1 mm, D6=3.9 mm, D7=2.7 mm, t1=3.3 mm, t2=2.1 mm, t3=1.2 mm and tA=1.7 mm.

In FIG. 1, the metal shell 1 is made with a metal such as low carbon steel or the like in the form of a cylinder and not only constitutes housing of a spark plug 100 but is provided with a threaded portion 7 for mounting the plug 100 to an engine block not shown. A reference numeral 1e indicates a tool engaging portion with which a tool such as a spanner or a wrench engages and the portion has a hexagonal section in a plane perpendicular to the axis.

Figure 3:
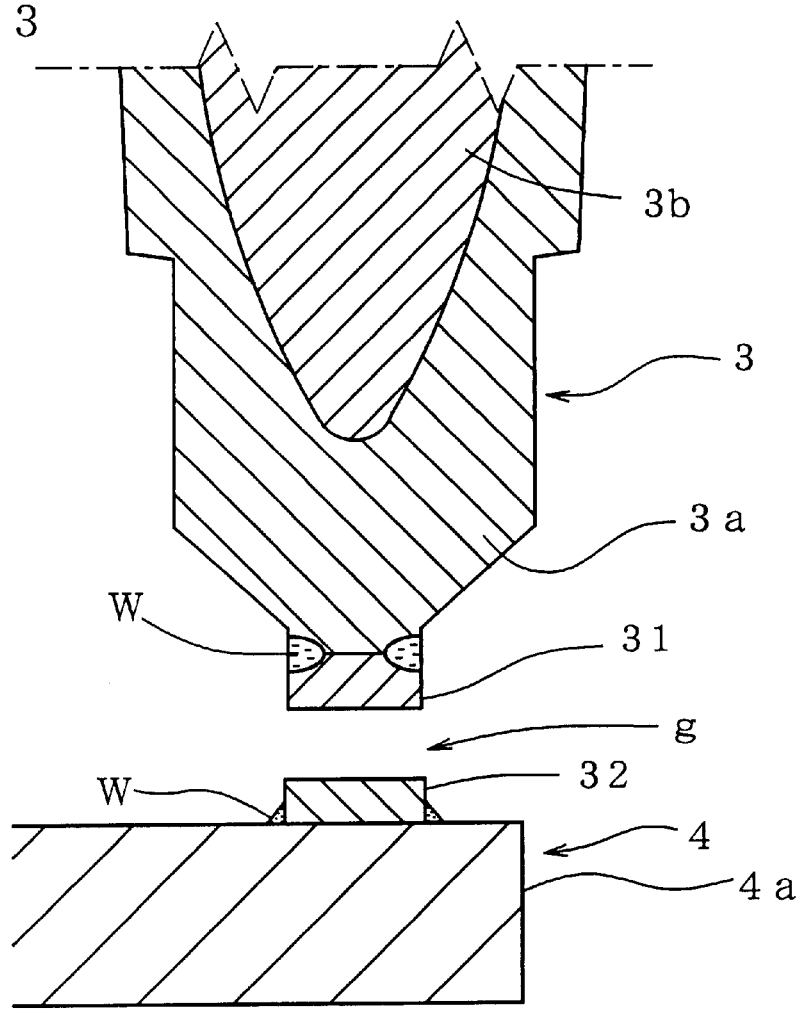
FIG. 3 is a further enlarged sectional view showing the neighborhood of an ignition portion of FIG. 1.

The main body sections 3a and 4a of the center electrode 6 and the ground electrode 4 (FIG. 3) are made of Ni alloy or the like. A core portion 3b made of Cu, Cu alloy or the like in order to accelerate heat dissipation is embedded in the interior of the center electrode 3. On the other hand, the first ignition portion 31 and the second ignition portion 32 opposed to the first one are made mainly of a noble metal alloy which is composed of one or more selected from the group consisting of Ir, Pt and Rh. As shown in FIG. 3, not only is the main body section 3a of the center electrode 3 tapered toward the fore-end side, but also the fore-end surface is formed flat. Disk-like chips made of a alloy composition constituting the ignition portions are placed in a superposing manner on the flat fore-end surface and a welded part W is formed by laser welding, electron beam welding, resistance welding or the like to fix and form the first ignition portion 31. The second ignition portion 32 is formed likewise in such a manner that a chip is placed on the ground electrode 4 at a corresponding position of the first ignition portion 31 and then a welded part is formed along a outer periphery of a bonding surface to fix the chip. The chips can be made from an alloy obtained by mixing alloy components in a composition in the above described ranges and thereafter melting the mixture, or from a sintered body obtained by press forming and sintering powder of an alloy obtained by the mixing and melting or a powder mixture composed of various kinds of single metal component powder in a prescribed composition. It should further be noted that at least one of the first and second ignition portions may be omitted.

The insulator 2 is produced, for example, in a process as shown below: First of all, as raw material powder, Bayer alumina powder having a Na component content in the range of 0.07 to 0.3 wt % (or desirably in the range of 0.07 to 0.3 wt %) and an average particle size in the range of 1 to 5 $\mu$m and source materials of additive element including an Si component, a Ca component, a Mg component, a Ba component and a B component are mixed in prescribed ratios so as to meet the above described composition in converted values in respective oxides after sintering. The raw material powder is added with a hydrophilic binder (for example PVA) and water to form a slurry of press forming preform-use powder. The source materials of additive element can take the respective following forms such as $SiO_2$ powder for the Si component; $CaCO_3$ powder for the Ca component; MgO powder for the a Mg component; $BaCO_3$ for the Ba component; and $H_3BO_3$ powder (or used as an aqueous solution thereof) for the B component. In this case, alumina powder is used that contains a content of the Na component present in surface regions of its particles in the range of 0.01 to 0.2 wt % (or desirably in the range of 0.01 to 0.1 wt %) as $Na_2O$.

Figure 11:
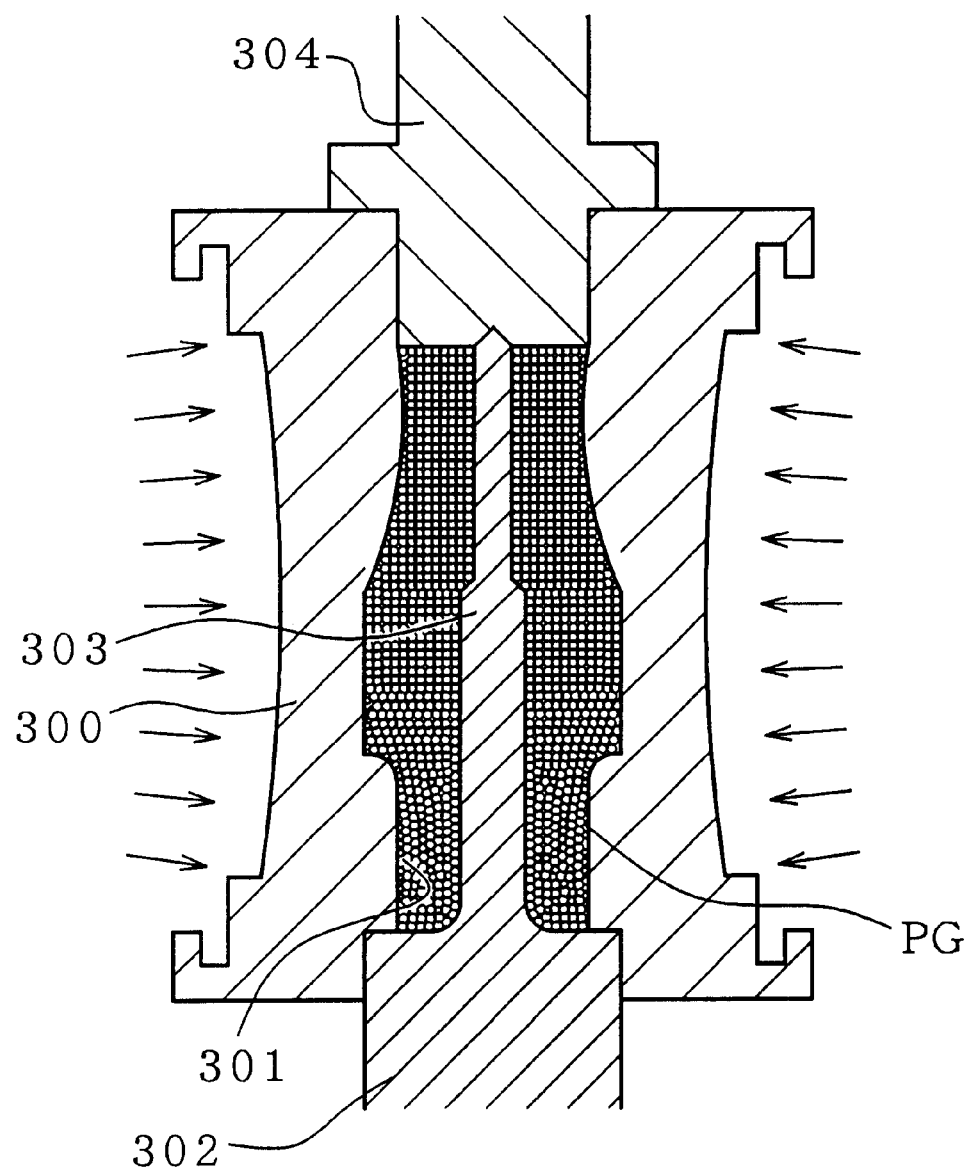
FIG. 11 is a sectional view illustrating a rubber press method.

The slurry is then jet-atomized and dried by a spray method or the like to form granules of preform-use powder. Thus formed granules are subjected to rubber press forming, thereby attaining a green which is an original form of a sintered body. FIG. 11 shows a sketch of a process step of rubber press forming. Herein, a rubber mold 300 having a cavity 301 the interior of which communicates along its axial direction is employed, and an upper punch 304 is fittingly inserted in an upper opening of the cavity 301. A press pin 303 which defines a form of through hole 6 (FIG. 1) of the insulator 2 not only extends along an axial direction of the cavity 301 therein, but the lower end of the press pin 303 is integrally attached to a punch surface of a lower punch 302.

Figure 12:
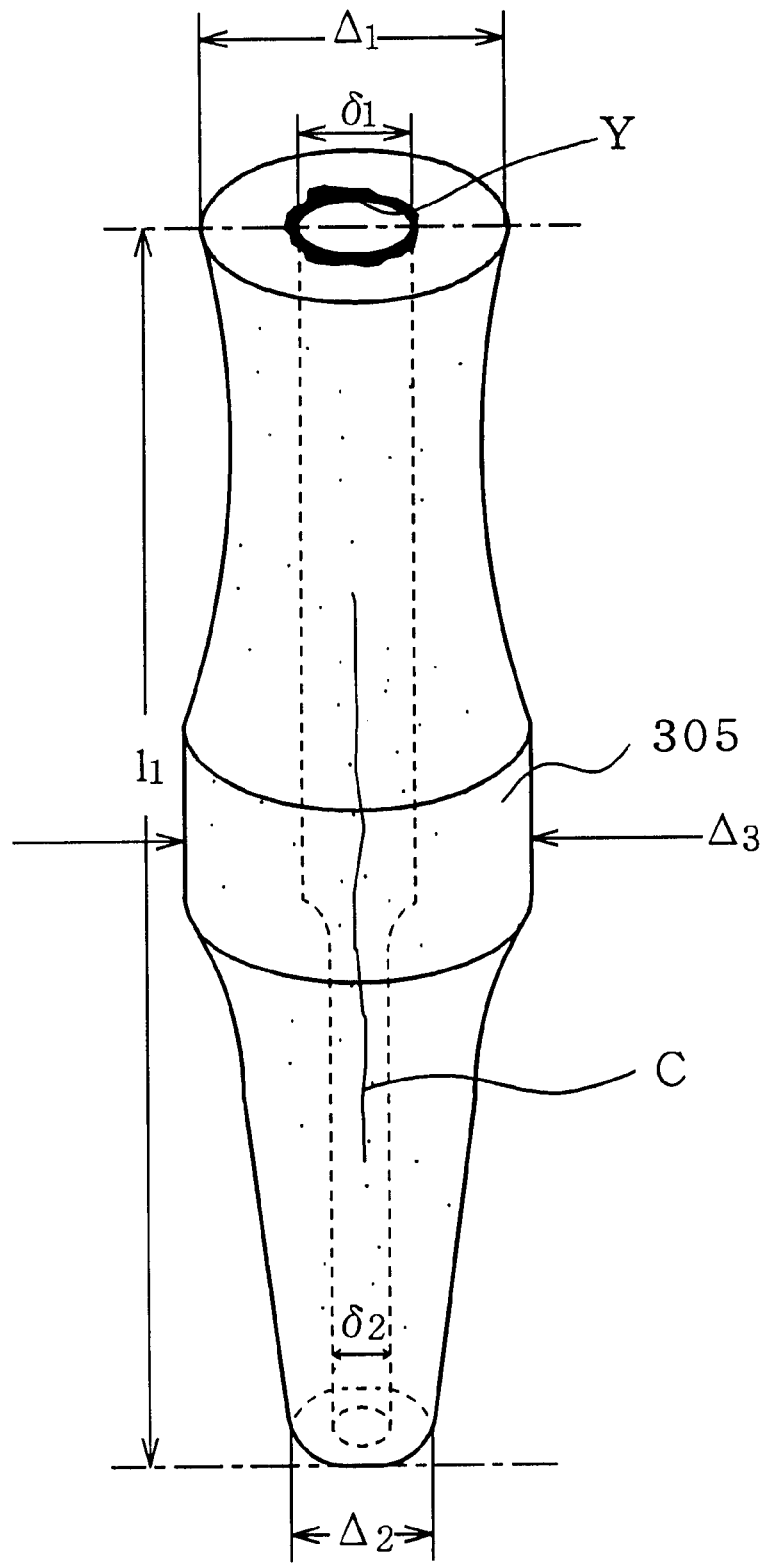
FIG. 12 is a perspective view showing an example of a green obtained by a rubber press method and ways of generating defects in the green.

A prescribed amount of the granules of preform-use powder PG are packed in the cavity in this state and the upper opening of the cavity 301 is plugged with the upper punch 304 to closely seal. A hydraulic pressure is applied to the outer side surface of the rubber mold 300 in the closed state and the granules PG in the cavity 301 is compressed together with the rubber mold 300. As a result, a green 305 by the press as shown in FIG. 12 is obtained. The granules PG is added with water in a ratio of 100 parts by wt of the granules PG to 0.7 to 13 parts by wt of water so that breaking of the granules PG into powder particles is accelerated and thereafter the pressing is operated.

The green 305 is mechanically processed by grinding or the like on its outer side surface into a shape corresponding the insulator 2 of FIG. 1 and then is subjected to sinter at a temperature in the range of 1400 to 1600° C. The sintered body is thereafter applied with a glaze and further receives a heat treatment for finish baking to complete the whole process.

In this process, when the preform-use powder slurry is prepared, the pH of the slurry considerably rises since a strongly basic compound such as $Na_2O$ or NaOH that is attached to the Bayer alumina powder (mainly on the surfaces of particles) is dissolved into a solvent. If a granules PG prepared by using such slurry in a high pH state is subjected to the rubber press forming with no other treatment on the slurry, a press forming performance of the granules PG is deteriorated and defects such as cracks C and collapses Y at the inside of the opening brim are apt to be produced. Even if no defects arise direct after the press forming, there is a risk of a trouble such as fracture in grinding or the like for final adjustment of outside dimensions since a strength of the green 305 itself is reduced.

Therefore, a proper acidic component, for example a citric acid, boric acid or the like in a proper amount is mixed into the slurry when being prepared and thereby, the pH of the slurry is adjusted to be in the range of 6 to 10 (or desirably in the range of 7 to 9). Granules PG produced with the preform-use powder slurry after the pH adjustment has a very good press forming performance and the green 305 has an improved production yield since the defects as described above are difficult to occur.

Below, description will be made upon features spark plug. The spark plug 100 is mounted to an engine block at its threaded portion 7 and used as an ignition source for an air-fuel mixture supplied into a combustion chamber.

The insulator 2 was produced with Bayer alumina powder of a Na component content as high as in the range 0.07 to 0.65 wt % as $Na_2O$. Therefore, an insulator produced with the alumina powder also has a Na component content as high as to have conventionally been regarded beyond the common sense: in the range of 0.07 to 0.5 wt % (part of the Na component has a chance to be lost in the sintering). However, as far as the Na component content of the insulator 2 is within the above described range, insulation resistance, mechanical strength and the like at high temperature is unexpectedly not decreased and therefore, a performance sufficiently comparable to a conventional insulator of a Na component content lower than that in the range can be obtained.

As a result of an action and effect described above, while highly expensive low soda alumina has conventionally been used in order to keep a Na component content at a low level, in the case of the present invention, medium soda and regular aluminas which are much lower in cost can be used as raw material, which entails dramatic decrease in production cost of insulator and thereby, of a spark plug 100 as well.

Figure 5:
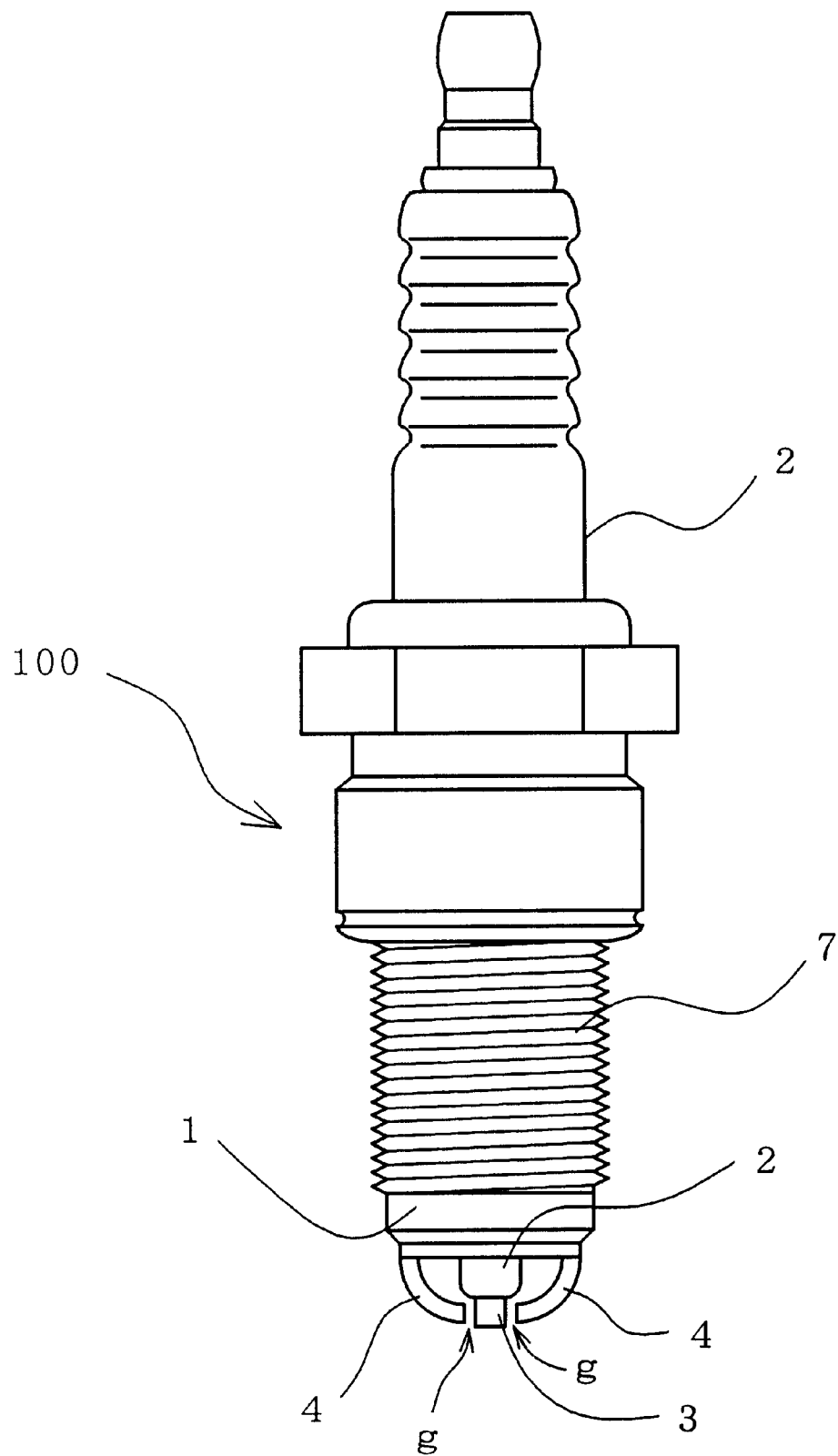
FIG. 5 is a front view showing the whole of another example of a spark plug of the present invention.

It should be noted that a spark plug to which insulator of the present invention is applicable is not limited to the type shown in FIG. 1, but other types may be adopted, for example one as shown in FIG. 5, in which example the top portion of the ground electrode 4 is formed in two or more ways: tip ends thereof are disposed in an opposed manner to the side surface of the center electrode 3 to form spark discharge gaps g. In this case, the ground electrode 4 can be arranged in various ways: as shown in FIG. 6(*a*), two tip ends of the top portion of the ground electrode 4 are located in an opposite manner to each other close to the side of the center electrode 3, and as shown in FIG. 6(*b*), three or more tip ends thereof are located around the center electrode 3 so as to be directed toward the center electrode 3.

Figure 7:
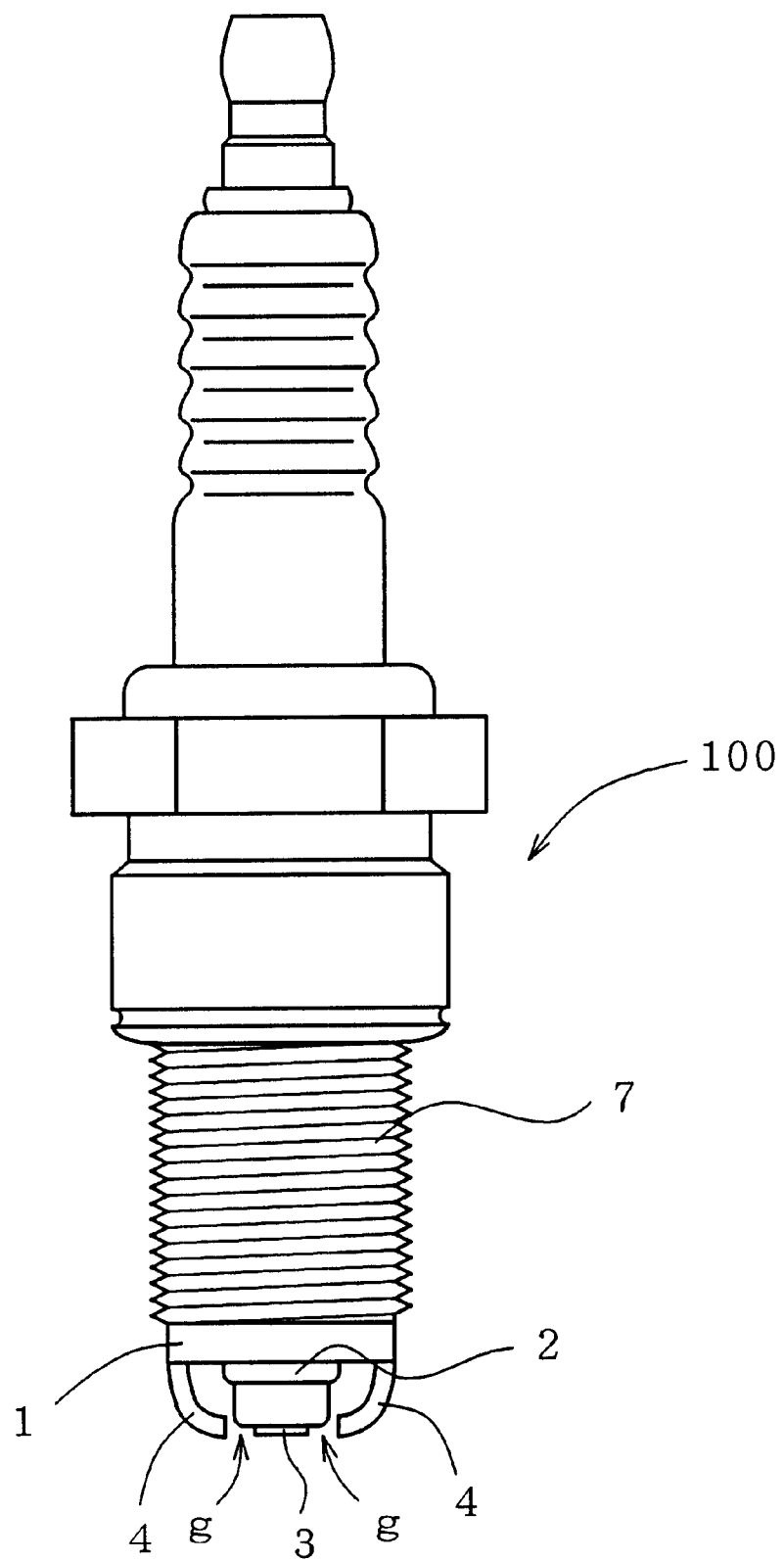
FIG. 7 is a front view showing the whole of still another example of a spark plug of the present invention.
Figure 8:
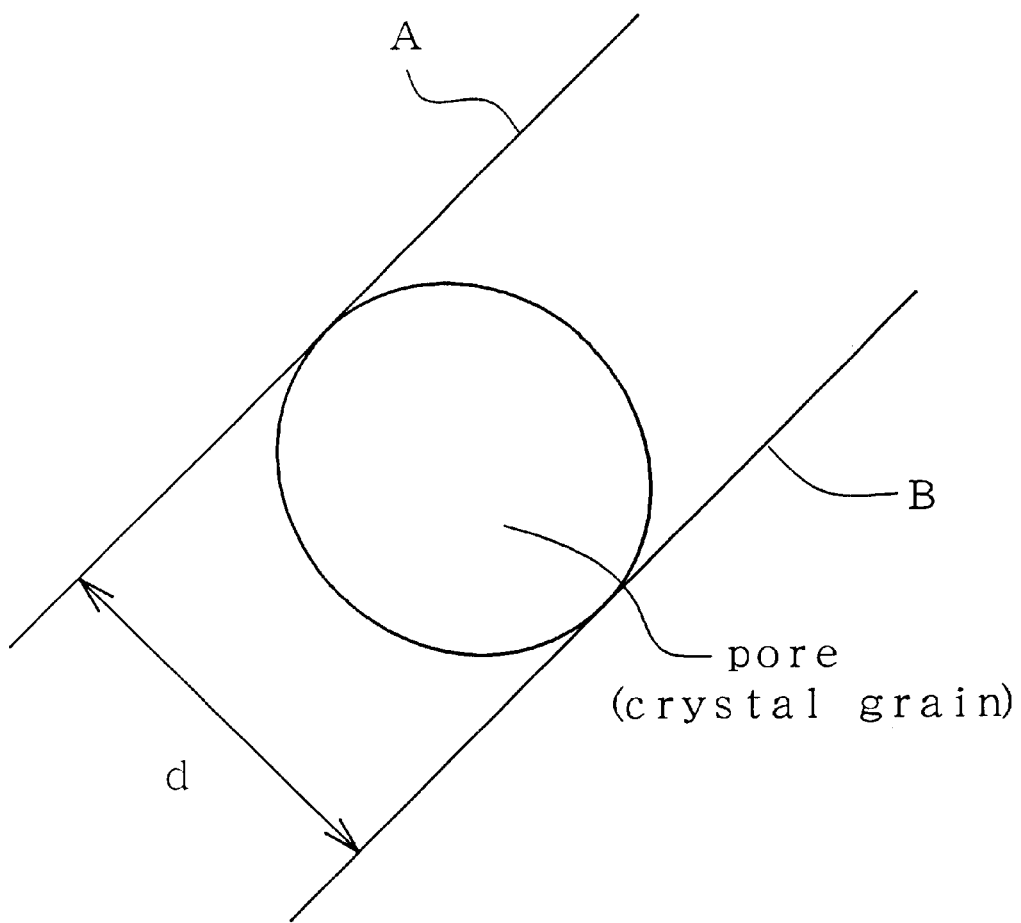
FIG. 8 is an illustration for a definition of a size of a pore or a crystal grain present in an insulator.

In this case, as shown in FIG. 7, a spark plug 100 may be constructed as a semi-surface discharge type spark plug in such a manner that the fore-end of the insulator 2 is advanced to between the side surface of the center electrode 3 and each of the tip ends of the top portion of the ground electrode 4. In this structure, since spark discharge arises in a way to run along a surface of the insulator 2, anti-fouling characteristics is improved to compared with an areal discharge type.

EXAMPLES

In order to confirm effects of the present invention, the following experiments were conducted.

Example 1

In order to prepare kinds of raw material powder, kinds of Bayer alumina powder (an average particle diameter of 3.0 $\mu$m) of different Na component contents were mixed with various compounds in prescribed ratios, wherein a purity and a particle diameter of each of the various compounds are as follows: $SiO_2$ (purity 99.5%, average particle diameter 1.5 $\mu$m), $CaCO_3$ (purity 99.9%, average particle diameter 2.0 $\mu$m), MgO (purity 99.5%, average particle diameter 2.0 $\mu$m), $BaCO_3$ (purity 99.5%, average particle diameter 1.5 $\mu$m), $H_3BO_3$ (purity 99.0%, average particle diameter 1.5 $\mu$m) and ZnO (purity 99.5%, average particle diameter 2.0 $\mu$m). One hundred parts by wt(weight) of thus prepared powder was further mixed with 3 parts by wt of PVA as a hydrophilic binder and 103 parts by wt of water in a wet condition to produce a slurry of preform-use powder. A value of the pH of the slurry was adjusted to 8 by addition of citric acid in a proper amount. A total content of Na component and a Na component content in surface regions of particles were measured by the above described method and an average particle diameter of the alumina powder was measured using a laser diffraction particle size analyzer.

Then, the slurries respectively of different compositions were dried by a spray dry method and granules of preform-use powder were thereby prepared, wherein the granules are controlled into particle sizes thereof in the range of 50 to 100 $\mu$m by screening. The granules were subjected to forming under a pressure of 50 MPa by a rubber press method described using FIG. 11 to obtain a green 305 shown in FIG. 12. The green 305 was subjected to grinding processing on an outer surface thereof to shape the green into prescribed dimensions of a green 2, which was followed by sintering at prescribed conditions to obtain a sintered green 2 made of alumina based insulator whose shape is similar to that of FIG. 1. Sintering conditions were determined in such a manner that a sintering period was fixed to be 2 hours but temperature for sintering was changed stepwise at 20° C. temperature differences, apparent densities of the insulators were measured on those obtained in respective conditions and sintering conditions in which the maximum density was attained were adopted.

Figure 4:
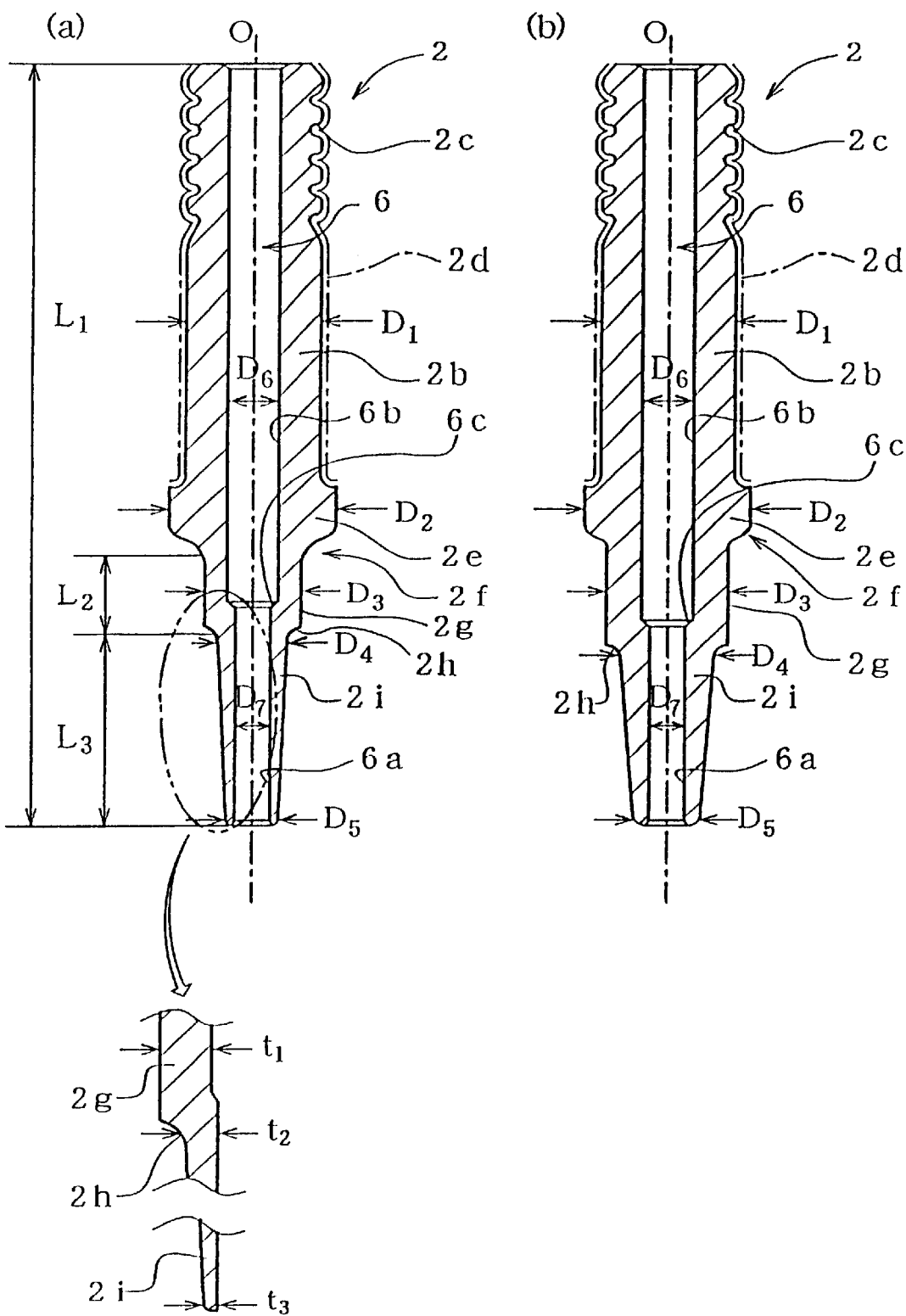
FIG. 4 is a vertical sectional view showing examples of insulators.

Dimensions of the insulators 2 that are expressed according to FIG. 4(*a*) are as follows: L1=about 60 mm, L2=about 8 mm, L3=about 14 mm, D1=about 10 mm, D2=about 13 mm, D3=about 7 mm, D4=5.5 mm, D5=4.5 mm, D6=4 mm, D7=2.6 mm t1=1.5 mm, t2=1.45 mm, t3=1.25 mm and tA=1.48 mm. Other dimensions will be shown according to FIG. 1: a length $L_Q$ of a portion 2*k* projecting toward the backward side of the metal shell 1 of the insulator 2 is 25 mm. A length $L_P$ measured along a sectional outline from a position corresponding to the rear end brim of the metal shell 1 through the corrugation 2*c* to the rear end brim of the insulator 2 is 29 mm.

Figure 10:
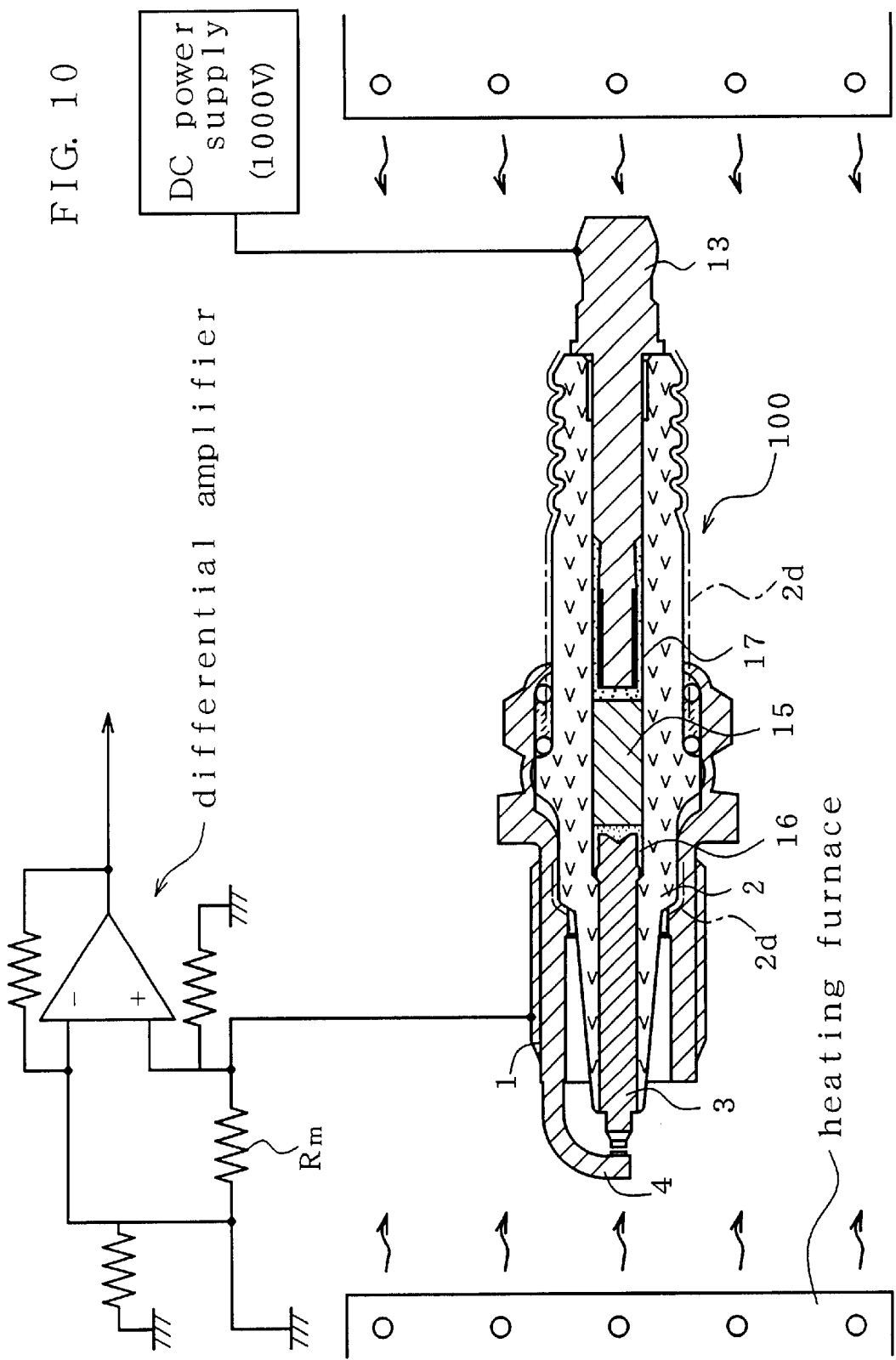
FIG. 10 is an illustration for a measuring method for insulation resistance of a spark plug.

Various kinds of spark plugs shown in FIG. 1 were produced using thus prepared insulator 2, wherein an outer diameter of the threaded portion was 12 mm and a structure was adopted in which the resistor 15 was not used and the metal terminal 13 and the center electrode 3 were directly connected through a conductive glass layer. The spark plugs received the following tests:

(1) Insulation withstand voltage at 20° C.: the voltage was measured according to the method that is described using FIG. 10, wherein a direct current impulse power supply (peak voltage 35 V and pulse width 2 ms) was used as a high-tension power supply, (2) Measurement of insulation resistance at 500° C.: the measurement was conducted at an applied voltage 1000 V according to the method that is described using FIG. 10, (3) Withstand voltage test in an actual vehicle: the above described spark plugs were mounted to a 4 cylinder gasoline engine (piston displacement 2000 cc), the engine was continuously run in a throttle full opening state at an engine revolution number of 6000 rpm while a discharge voltage was controlled in the range of 38 to 43 kV and evaluation was conducted by checking whether or not spark penetration took place after 50 hours elapsed.

Besides, strength test pieces were prepared using the same granules as follows: The granules were press-formed by die pressing (pressure 50 MPa) into a green and sintered in the same conditions as in the case of the above described insulator. The sintered bodies obtained were subjected to grinding in a proper manner to prepare a test piece in the shape of a prism of 3 mm×3 mm×25 mm. The test piece was used to measure a three point bending strength at room temperature (span length 20 mm) according to a method described in JIS R1601 (Testing method for flexural strength (modulus of rupture) of high performance ceramics).

A surface of a test piece after the test was polished and the polished surface was observed by a scanning electron microscope (magnification 150×). The number of pores, which was revealed on the polished surface, equal to or larger than 10 $\mu$m were counted by means of image analysis. A pore surface density which means the number of pores counted per 1 mm$^2$ was obtained by dividing a total number of counted pores by an area of a view field in mm$^2$. Contents of element components of Al, Na, Si, Ca, Mg Ba, Zn and B were analyzed by the ICP method and the results were converted to contents (in wt %) in the respective prescribed oxide forms. A content of Na component in a glassy phase was calculated by the above described method (wherein EPMA was adopted as a micro-structure analytical method). All the results are shown in Tables 1 and 2.

It is found from the results shown in the tables that the insulator whose Na component content was in the range of 0.07 to 0.5 wt % was able to obtain an insulation withstand voltage, a strength and a withstand voltage in an actual vehicles comparable to those of a conventional insulator whose Na component content was equal to or less than 0.05 wt %, and besides, in the example, values of insulation resistance at 500° C. of spark plugs also showed as high as 200 MΩ or more.

Example 2

In order to prepare kinds of raw material powder, kinds of Bayer alumina powder (an average particle diameter of 3.0 μm) of different Na component contents ere mixed with various compounds in prescribed ratios, wherein a purity and a particle diameter of each of the various compounds are as follows: $SiO_2$ (purity 99.5%, average particle diameter 1.5 μm), $CaCO_3$ (purity 99.9%, average particle diameter 2.0 μm), MgO (purity 99.5%, average particle diameter 2.0 μm). One hundred parts by wt of thus prepared powder was further mixed with 3 parts by wt of PVA as a hydrophilic binder and 103 parts by wt of water in a wet condition to produce the slurry. A value of the pH of the slurry was adjusted to 8 by addition of citric acid in a proper amount, a total content of Na component and a Na component content in surface regions of particles were measured according to the above described method after cleaning and an average particle diameter of the alumina powder was measured using a laser diffraction particle size analyzer.

The slurry was used and the same experiments as those in Example 1 were conducted, with the results shown in Tables 3 and 4.

It is found from the results shown in the tables that by using alumina powder, whose particles have surface regions of a Na component content equal to or less than 0.2 wt %, the insulator was able to have more excellent results in insulation withstand voltage, insulation resistance at 500° C. and a withstand voltage in real conditions.

Example 3

One hundred g of each of various kinds of Bayer alumina powder (an average particle diameter of 3.0 μm) of different Na component contents was mixed with 100 g of distilled water at 25° C. and the mixture was stirred for 10 min, then followed by water washing, dehydration and drying. In order to prepare kinds of raw material powder, kinds of Bayer alumina powder which had been cleaned were mixed with various compounds in prescribed ratios, wherein a purity and particle diameter of each of the various compounds are as follows: $SiO_2$ (purity 99.5%, average particle diameter 1.5 μm), $CaCO_3$ (purity 99.9%, average particle diameter 2.0 μm), MgO (purity 99.5%, average particle diameter 2.0 μm), $BaCO_3$ (purity 99.5%, average particle diameter 1.5 μm) and $H_3BO_3$ (purity 99.0%, average particle diameter 1.5 μm). One hundred parts by wt of thus prepared powder was further mixed with 3 parts by wt of PVA as a hydrophilic binder and 103 parts by wt of water in a wet condition to produce a slurry. A value of the pH of the slurry was adjusted to 8 by addition of citric acid in a proper amount, a total content of Na component and a Na component content in surface regions of particles were measured according to the above described method after cleaning and an average particle diameter of the alumina powder was measured using a laser diffraction particle size analyzer.

The slurry was used and the same experiments as those in Example 1 were conducted, with the results shown in Tables 5 and 6.

It is found from the results shown in the tables that when alumina powder whose particles had surface regions of a Na component content less than 0.2 wt % was used, even the sintered bodies, whose Na component content was a little more than 0.5 wt % was able to have still comparatively excellent results in insulation withstand voltage, strength, insulation resistance at 500° C. and withstand voltage in an actual vehicle.

Example 4

In order to prepare kinds of raw material powder, kinds of Bayer alumina powder of almost the same Na component contents, but of average particle diameters different from one another were mixed with various compounds in prescribed ratios, wherein a purity and particle diameter of each of the various compounds are as follows: $SiO_2$ (purity 99.5%, average particle diameter 1.5 μm), $CaCO_3$ (purity 99.9%, average article diameter 2.0 μm), MgO (purity 99.5%, average particle diameter 2.0 μm), $BaCO_3$ (purity 99.5%, average particle diameter 1.5 μm), $H_3BO_3$ (purity 99.0%, average particle diameter 1.5 μm). One hundred parts by wt of thus prepared powder was further mixed with 3 parts by wt of PVA as a hydrophilic binder and 103 parts by wt of water in a wet condition to produce the slurry. A value of the pH of the slurry was adjusted to 8 by addition of citric acid in a proper amount, a total content of Na component and a Na component content in surface regions of particles were measured according to the above described method after cleaning and an average particle diameter of the alumina powder was measured using a laser diffraction particle size analyzer.

The slurry was used and the same experiments as those in Example 1 were conducted, with the results shown in Tables 7 and 8.

It is found from the results shown in the tables that as an average particle diameter of alumina powder is increased, an optimal sintering temperature is raised.

Example 5

In order to prepare kinds of raw material powder, kinds of Bayer alumina powder (an average particle diameter of 3.0 μm) of different Na component contents were mixed with various compounds in prescribed ratios, wherein a purity and a particle diameter of each of the various compounds are as follows: $SiO_2$ (purity 99.5%, average particle diameter 1.5 μm), $CaCO_3$ (purity 99.9%, average particle diameter 2.0 μm), MgO (purity 99.5%, average particle diameter 2.0 μm). One hundred parts by wt of thus prepared powder was further mixed with 3 parts by wt of PVA as a hydrophilic binder and 103 parts by wt of water in a wet condition to produce the slurry. A value of the pH of the slurry was adjusted to 8 by addition of citric acid in a proper amount, a total content of Na component and a Na component content in surface regions of particles were measured according to the above described method and an average particle diameter of the alumina powder was measured using a laser diffraction particle size analyzer.

The slurry was used and the same experiments as those in Example 1 were conducted with the results shown in Tables 9 and 10.

It is found from the results shown in the tables that when $Al_2O_3$ component in the insulator was in the range of 85 to 98 wt %, the insulator was able to have excellent results in any of insulation withstand voltage and a strength.

Example 6

In order to prepare kinds of raw material powder, kinds of Bayer alumina powder (an average particle diameter of 3.0 μm) of different Na component contents were mixed with various compounds in prescribed ratios shown in Tables 11 and 12 (wherein contents are shown in oxides), wherein a purity and a particle diameter of each of the various compounds are as follows: $SiO_2$ (purity 99.5%, average particle diameter 1.5 μm), $CaCO_3$ (purity 99.9%, average particle diameter 2.0 μm), MgO (purity 99.5%, average particle diameter 2.0 μm), BaCO$_3$ (purity 99.5%, average particle diameter 1.5 μm), and ZnO (purity 99.5%, average particle diameter 1.5 μm). One hundred parts by wt of thus prepared powder was further mixed with 3 parts by wt of PVA as a hydrophilic binder and 103 parts by wt of water in a wet condition to produce a preform-use powder slurry.

A value of the pH of the slurry was adjusted to 8 by addition of citric acid or H$_3$BO$_3$ as acidic component. Tables 11 and 12 show additive amounts of respective acidic components in wt % relative to total weights of respective raw material powder masses (a weight of each raw material powder mass without the acidic component).

The slurrys were dried by a spray dry method to produce granules each with a spherical shape. Sizes of the granules were controlled by screening so as to be in the range of 50 to 100 μm in particle diameter. The sieved granules were press-formed by the rubber press method described using FIG. 11 under a pressure of 50 MPa to prepare green 305 with the shape shown in FIG. 12. Dimensions shown in FIG. 12 are as follows: $l_1$=85 mm, $\Delta_1$=19 mm, $\Delta_2$=9 mm, $\Delta_3$=18 mm, $\delta_1$=4.8 and $\delta_2$=3.1 mm. An obtained green was immersed in a defect inspection liquid (suspension of red pigment in kerosene) and taken out from the liquid. On this occasion, if there are defects such as cracks on the surface of the green 305 or collapses at an inner peripheral portion of the opening brim thereof, the inspection liquid is impregnated into the bulk and thereby no coloring in the appearance is produced. Hence, a degree of defect occurrence can visually be recognized observing coloring on the surface. Evaluation was expressed in three ways on the basis of degrees of defect occurrence; ○ was used as an evaluation result in a case where absolutely no defect was recognized, Δ was used as an evaluation result in a case where while defects were recognized, the occurrence was extremely slight and X was used as an evaluation result in a case where defects arose very much.

Green for strength test in a plate of 12 mm×8 mm×80 mm were produced using a metal mold press forming (under a pressure of 50 MPa) using the same granules and three point bending strength (a span length was 50 mm) of each test mass was measured at room temperature, which results are shown in Tables 11 and 12.

It is found from the tables that when any of citric acid and H$_3$BO$_3$ was used, if a value of the pH of a preform-use powder slurry was adjusted in the range of 6 to 10 as well, and especially in the range of 7 to 9, defects were hard to arise and a bending strength was also improved.

Industrial Applicability

According to the present invention, as described above, alumina powder in use is one that contains a high content range of Na component which is regarded as being beyond the common sense: in a concrete manner of description, in the range of 0.07 to 0.65 wt % as Na$_2$O and the alumina powder in use further has a Na component content present in the surface regions of particles of the alumina powder in the range of 0.01 to 0.2 wt %. With use of such alumina powder, an insulation resistance, mechanical strength or the like at high temperature of insulator from the aluminum powder is not decreased to an extent which would otherwise be expected and there can be obtained an insulator of the present invention showing a performance comparable to a conventional insulator of a Na component content lower than that of the insulator of the present invention. Besides, a spark plug using the insulator of the present invention can secure an insulation resistance equal to or higher than 200 MΩ, which has conventionally been regarded as impossible in the Na component content range, wherein the insulating resistance is measured in conditions that the entire spark plug is heated at a constant temperature of 500° C. and a current is made to pass through the spark plug between the terminal metal member and the metal shell at the temperature. Besides, since medium soda and regular soda alumina which are much lower in cost than conventional low conventional can be used instead of the conventional low soda alumina, dramatic cost reduction for insulator and thereby, also for a spark plug using the same can be of reality.

TABLE 1

| Test piece No. | Na$_2$O in sintered mass (wt %) | Used alumina powder Total Na$_2$O (wt %) | Surface Na$_2$O (wt %) | Av. Particle diam. (μm) | Composition (wt %) Al$_2$O$_3$ | SiO$_2$ | CaO | MgO | Others ① | | Others ② | | Na in glassy phase (wt %) | Sintering conditions ° C. × (h) |
|---|---|---|---|---|---|---|---|---|---|---|---|---|---|---|
| A-1* | 0.03* | 0.04 | 0.01 | 3.0 | 94.0 | 2.68 | 1.79 | 0.5 | BaO | 0.7 | B$_2$O$_3$ | 0.3 | 0.33 | 1550 × 2 |
| A-2* | 0.05* | 0.07 | 0.02 | 3.0 | 94.0 | 2.67 | 1.78 | 0.5 | BaO | 0.7 | B$_2$O$_3$ | 0.3 | 0.67 | 1550 × 2 |
| A-3 | 0.07 | 0.10 | 0.03 | 3.0 | 94.0 | 2.66 | 1.77 | 0.5 | BaO | 0.7 | B$_2$O$_3$ | 0.3 | 0.67 | 1550 × 2 |
| A-4 | 0.12 | 0.17 | 0.05 | 3.0 | 94.0 | 2.64 | 1.74 | 0.5 | BaO | 0.7 | B$_2$O$_3$ | 0.3 | 1.00 | 1550 × 2 |
| A-5 | 0.25 | 0.35 | 0.14 | 3.0 | 94.0 | 2.57 | 1.68 | 0.5 | BaO | 0.7 | B$_2$O$_3$ | 0.3 | 1.83 | 1550 × 2 |
| A-6 | — | 0.63 | 0.19 | 3.0 | 94.0 | 2.19 | 1.6 | 0.5 | BaO | 0.7 | B$_2$O$_3$ | 0.3 | 2.83 | 1550 × 2 |
| A-7* | 0.53* | 0.78 | 0.23 | 3.0 | 94.0 | 2.43 | 1.54 | 0.5 | BaO | 0.7 | B$_2$O$_3$ | 0.3 | 3.67 | 1550 × 2 |
| A-8* | 0.7* | 1.02 | 0.36 | 3.0 | 94.0 | 2.35 | 1.45 | 0.5 | BaO | 0.7 | B$_2$O$_3$ | 0.3 | 4.52 | 1550 × 2 |
| A-9* | 0.94* | 1.44 | 0.43 | 3.0 | 94.0 | 2.23 | 1.33 | 0.5 | BaO | 0.7 | B$_2$O$_3$ | 0.3 | 4.82 | 1550 × 2 |
| E-1 | 0.31 | 0.45 | 0.16 | 3.0 | 94 | 2.54 | 1.65 | 0.5 | BaO | 1.0 | — | | 1.81 | 1550 × 2 |
| E-2 | 0.33 | 0.45 | 0.16 | 3.0 | 94 | 2.53 | 1.64 | 0.5 | BaO | 0.5 | ZnO | 0.5 | 1.60 | 1550 × 2 |
| E-3 | 0.30 | 0.45 | 0.16 | 3.0 | 94 | 2.55 | 1.65 | 0.5 | B$_2$O$_3$ | 0.2 | ZnO | 0.8 | 2.00 | 1550 × 2 |
| E-4 | 0.25 | 0.35 | 0.12 | 3.5 | 93 | 3.45 | 2.2 | 0.5 | B$_2$O$_3$ | 0.6 | — | | 1.48 | 1560 × 2 |
| E-5 | 0.25 | 0.35 | 0.12 | 3.5 | 93 | 3.45 | 2.2 | 0.5 | B$_2$O$_3$ | 0.3 | BaO | 0.3 | 1.98 | 1560 × 2 |

*indicates that a test piece, a value and/or the like in the table is outside the scope of the present invention.

TABLE 2

| Test piece No. | Pore surface density (count/mm²) | Withstand Voltage 20° C. (kV/mm) | Insulation resistance 500° C. (MΩ) | Strength (MPa) | Withstand voltage in actual vehicle test result |
|---|---|---|---|---|---|
| A-1* | 24 | 43 | 5000 | 450 | ○ |
| A-2* | 36 | 41 | 4500 | 460 | ○ |
| A-3 | 15 | 45 | 3500 | 480 | ○ |
| A-4 | 53 | 40 | 3000 | 400 | ○ |
| A-5 | 52 | 41 | 1000 | 410 | ○ |
| A-6 | 41 | 42 | 500 | 430 | ○ |
| A-7* | 36 | 34 | 150* | 450 | X |
| A-8* | 15 | 32 | 100* | 440 | X |
| A-9* | 18 | 31 | 70* | 460 | X |
| E-1 | 49 | 43 | 1500 | 410 | ○ |
| E-2 | 37 | 42 | 1800 | 420 | ○ |
| E-3 | 28 | 46 | 1900 | 450 | ○ |
| E-4 | 22 | 48 | 1600 | 430 | ○ |
| E-5 | 36 | 47 | 1800 | 400 | ○ |

*indicates that a test piece, a value and/or the like in the table is outside the scope of the present invention.

TABLE 3

| Test piece No. | Na₂O in sintered mass (wt %) | Used alumina powder Total Na₂O (wt %) | Surface Na₂O (wt %) | Av. Particle diam. (μm) | Composition (wt %) Al₂O₃ | SiO₂ | CaO | MgO | Others ① | ② | Na in glassy phase (wt %) | Sintering conditions ° C. × (h) |
|---|---|---|---|---|---|---|---|---|---|---|---|---|
| B-1 | 0.01 | 0.02 | 0.007 | 3.0 | 94.0 | 3.19 | 2.0 | 0.8 | — | — | 0.10 | 1550 × 2 |
| B-2 | 0.02 | 0.03 | 0.01 | 3.0 | 94.0 | 3.19 | 1.99 | 0.8 | — | — | 0.16 | 1550 × 2 |
| B-3 | 0.05 | 0.07 | 0.02 | 3.0 | 94.0 | 3.17 | 1.98 | 0.8 | — | — | 0.51 | 1550 × 2 |
| B-4 | 0.07 | 0.10 | 0.03 | 3.0 | 94.0 | 3.16 | 1.97 | 0.8 | — | — | 0.63 | 1550 × 2 |
| B-5 | 0.10 | 0.14 | 0.05 | 3.0 | 94.0 | 3.15 | 1.95 | 0.8 | — | — | 0.83 | 1550 × 2 |
| B-6 | 0.19 | 0.27 | 0.08 | 3.0 | 94.0 | 3.1 | 1.91 | 0.8 | — | — | 1.71 | 1550 × 2 |
| B-7 | 0.20 | 0.28 | 0.11 | 3.0 | 94.0 | 3.1 | 1.9 | 0.8 | — | — | 1.68 | 1550 × 2 |
| B-8 | 0.26 | 0.38 | 0.15 | 3.0 | 94.0 | 3.07 | 1.87 | 0.8 | — | — | 1.73 | 1550 × 2 |
| B-9 | 0.32 | 0.45 | 0.16 | 3.0 | 94.0 | 3.04 | 1.84 | 0.8 | — | — | 1.86 | 1550 × 2 |
| B-10 | 0.35 | 0.50 | 0.18 | 3.0 | 94.0 | 3.02 | 1.83 | 0.8 | — | — | 1.98 | 1550 × 2 |
| B-11 | 0.38 | 0.58 | 0.20 | 3.0 | 94.0 | 3.01 | 1.81 | 0.8 | — | — | 2.53 | 1550 × 2 |
| B-12* | 0.54* | 0.77 | 0.27 | 3.0 | 94.0 | 2.93 | 1.73 | 0.8 | — | — | 5.44 | 1550 × 2 |
| B-13* | 0.59* | 0.98 | 0.30 | 3.0 | 94.0 | 2.9 | 1.71 | 0.8 | — | — | 6.23 | 1550 × 2 |

*indicates that a test piece, a value and/or the like in the table is outside the scope of the present invention.

TABLE 4

| Test piece No. | Pore surface density (count/mm²) | Withstand Voltage 20° C. (kV/mm) | Insulation resistance 500° C. (MΩ) | Strength (MPa) | Withstand voltage in actual vehicle test result |
|---|---|---|---|---|---|
| B-1 | 26 | 46 | 5500 | 470 | ○ |
| B-2 | 32 | 43 | 5000 | 460 | ○ |
| B-3 | 28 | 43 | 4000 | 470 | ○ |
| B-4 | 25 | 42 | 3000 | 450 | ○ |
| B-5 | 18 | 41 | 3000 | 430 | ○ |
| B-6 | 14 | 42 | 2500 | 420 | ○ |
| B-7 | 23 | 43 | 2000 | 440 | ○ |
| B-8 | 16 | 43 | 1800 | 450 | ○ |
| B-9 | 21 | 41 | 850 | 430 | ○ |
| B-10 | 34 | 41 | 700 | 430 | ○ |
| B-11 | 37 | 39 | 500 | 370 | ○ |
| B-12* | 26 | 33 | 120* | 420 | X |
| B-13* | 24 | 34 | 100* | 410 | X |

*indicates that a test piece, a value and/or the like in the table is outside the scope of the present invention.

TABLE 5

| Test piece No. | Na$_2$O in sintered mass (wt %) | Used alumina powder Total Na$_2$O (wt %) | Used alumina powder Surface Na$_2$O (wt %) | Av. Particle diam. (μm) | Composition (wt %) Al$_2$O$_3$ | SiO$_2$ | CaO | MgO | Others ① | | Others ② | | Na in glassy phase (wt %) | Sintering conditions °C. × (h) |
|---|---|---|---|---|---|---|---|---|---|---|---|---|---|---|
| B-14 | 0.1  | 0.14 | 0.02 | 3.0 | 94.0 | 2.65 | 1.75 | 0.5 | BaO | 0.7 | B$_2$O$_3$ | 0.3 | 1.03 | 1550 × 2 |
| B-15 | 0.2  | 0.28 | 0.05 | 3.0 | 94.0 | 2.6  | 1.7  | 0.5 | BaO | 0.7 | B$_2$O$_3$ | 0.3 | 0.61 | 1550 × 2 |
| B-16 | 0.38 | 0.59 | 0.06 | 3.0 | 94.0 | 2.51 | 1.61 | 0.5 | BaO | 0.7 | B$_2$O$_3$ | 0.3 | 1.23 | 1550 × 2 |
| B-17 | 0.53 | 0.75 | 0.10 | 3.0 | 94.0 | 2.43 | 1.54 | 0.5 | BaO | 0.7 | B$_2$O$_3$ | 0.3 | 1.77 | 1550 × 2 |
| B-18 | 0.56 | 0.80 | 0.13 | 3.0 | 94.0 | 2.42 | 1.52 | 0.5 | BaO | 0.7 | B$_2$O$_3$ | 0.3 | 1.92 | 1550 × 2 |

TABLE 6

| Test piece No. | Pore surface density (count/mm$^2$) | Withstand Voltage 20° C. (kV/mm) | Insulation resistance 500° C. (MΩ) | Strength (MPa) | Withstand voltage in actual vehicle test result |
|---|---|---|---|---|---|
| B-14 | 18 | 48 | 3800 | 440 | ○ |
| B-15 | 17 | 49 | 3000 | 420 | ○ |
| B-16 | 22 | 45 | 3200 | 430 | ○ |
| B-17 | 27 | 42 | 2000 | 410 | ○ |
| B-18 | 18 | 44 | 1800 | 400 | ○ |

TABLE 7

| Test piece No. | Na$_2$O in sintered mass (wt %) | Used alumina powder Total Na$_2$O (wt %) | Used alumina powder Surface Na$_2$O (wt %) | Av. Particle diam. (μm) | Composition (wt %) Al$_2$O$_3$ | SiO$_2$ | CaO | MgO | Others ① | | Others ② | | Na in glassy phase (wt %) | Sintering conditions °C. × (h) |
|---|---|---|---|---|---|---|---|---|---|---|---|---|---|---|
| C-1  | 0.14 | 0.20 | 0.08 | 0.5  | 94.0 | 2.63 | 1.73 | 0.5 | BaO | 0.7 | B$_2$O$_3$ | 0.3 | 1.88 | 1540 × 2 |
| C-2  | 0.14 | 0.20 | 0.08 | 0.7  | 94.0 | 2.63 | 1.73 | 0.5 | BaO | 0.7 | B$_2$O$_3$ | 0.3 | 1.73 | 1540 × 2 |
| C-3  | 0.14 | 0.20 | 0.08 | 1.0  | 94.0 | 2.63 | 1.73 | 0.5 | BaO | 0.7 | B$_2$O$_3$ | 0.3 | 1.61 | 1540 × 2 |
| C-4  | 0.14 | 0.20 | 0.08 | 1.8  | 94.0 | 2.63 | 1.73 | 0.5 | BaO | 0.7 | B$_2$O$_3$ | 0.3 | 1.57 | 1540 × 2 |
| C-5  | 0.13 | 0.20 | 0.07 | 2.5  | 94.0 | 2.63 | 1.74 | 0.5 | BaO | 0.7 | B$_2$O$_3$ | 0.3 | 0.61 | 1560 × 2 |
| C-6  | 0.13 | 0.20 | 0.07 | 3.0  | 94.0 | 2.63 | 1.74 | 0.5 | BaO | 0.7 | B$_2$O$_3$ | 0.3 | 0.65 | 1560 × 2 |
| C-7  | 0.13 | 0.20 | 0.07 | 4.0  | 94.0 | 2.63 | 1.74 | 0.5 | BaO | 0.7 | B$_2$O$_3$ | 0.3 | 0.73 | 1560 × 2 |
| C-8  | 0.13 | 0.20 | 0.07 | 4.6  | 94.0 | 2.63 | 1.74 | 0.5 | BaO | 0.7 | B$_2$O$_3$ | 0.3 | 0.70 | 1560 × 2 |
| C-9  | 0.12 | 0.20 | 0.06 | 5.0  | 94.0 | 2.64 | 1.74 | 0.5 | BaO | 0.7 | B$_2$O$_3$ | 0.3 | 0.96 | 1580 × 2 |
| C-10 | 0.12 | 0.20 | 0.06 | 5.8  | 94.0 | 2.64 | 1.74 | 0.5 | BaO | 0.7 | B$_2$O$_3$ | 0.3 | 0.81 | 1600 × 2 |
| C-11 | 0.12 | 0.20 | 0.06 | 8.0  | 94.0 | 2.64 | 1.74 | 0.5 | BaO | 0.7 | B$_2$O$_3$ | 0.3 | 0.72 | 1600 × 2 |
| C-12 | 0.1  | 0.20 | 0.06 | 10.2 | 94.0 | 2.65 | 1.75 | 0.5 | BaO | 0.7 | B$_2$O$_3$ | 0.3 | 0.67 | 1620 × 2 |

TABLE 8

| Test piece No. | Pore surface density (count/mm$^2$) | Withstand Voltage 20° C. (kV/mm) | Insulation resistance 500° C. (MΩ) | Strength (MPa) | Withstand voltage in actual vehicle test result |
|---|---|---|---|---|---|
| C-1  | 15 | 46 | 2800 | 460 | ○ |
| C-2  | 12 | 48 | 2900 | 480 | ○ |
| C-3  | 21 | 51 | 3500 | 460 | ○ |
| C-4  | 18 | 47 | 3600 | 470 | ○ |
| C-5  | 19 | 47 | 3500 | 470 | ○ |
| C-6  | 23 | 46 | 3800 | 460 | ○ |
| C-7  | 32 | 43 | 3800 | 420 | ○ |
| C-8  | 45 | 44 | 3500 | 400 | ○ |
| C-9  | 39 | 43 | 3600 | 400 | ○ |
| C-10 | 51 | 42 | 3200 | 360 | ○ |
| C-11 | 68 | 38 | 3000 | 320 | ○ |
| C-12 | 92 | 36 | 3000 | 300 | ○ |

TABLE 9

| Test piece No. | Na₂O in sintered mass (wt %) | Used alumina powder Total Na₂O (wt %) | Used alumina powder Surface Na₂O (wt %) | Av. Particle diam. (μm) | Composition (wt %) Al₂O₃ | SiO₂ | CaO | MgO | Others ① | Others ② | Na in glassy phase (wt %) | Sintering conditions ° C. × (h) |
|---|---|---|---|---|---|---|---|---|---|---|---|---|
| D-1 | 0.10 | 0.20 | 0.06 | 3.0 | 80.0 | 10.6 | 6.7 | 2.6 | — | — | 0.41 | 1550 × 2 |
| D-2 | 0.10 | 0.20 | 0.06 | 3.0 | 85.0 | 7.9 | 5.0 | 2.0 | — | — | 0.53 | 1550 × 2 |
| D-3 | 0.13 | 0.20 | 0.06 | 3.0 | 92.0 | 3.13 | 2.64 | 2.1 | — | — | 0.96 | 1550 × 2 |
| D-4 | 0.13 | 0.20 | 0.06 | 3.0 | 95.0 | 2.13 | 1.64 | 0.6 | — | — | 1.55 | 1560 × 2 |
| D-5 | 0.14 | 0.20 | 0.06 | 3.0 | 97.0 | 1.53 | 0.93 | 0.4 | — | — | 1.82 | 1560 × 2 |
| D-6 | 0.14 | 0.20 | 0.06 | 3.0 | 98.0 | 0.93 | 0.63 | 0.3 | — | — | 1.96 | 1580 × 2 |
| D-7 | 0.15 | 0.20 | 0.06 | 3.0 | 99.0 | 0.52 | 0.23 | 0.1 | — | — | 3.21 | 1600 × 2 |

TABLE 10

| Test piece No. | Pore surface density (count/mm²) | Withstand Voltage 20° C. (kV/mm) | Insulation resistance 500° C. (MΩ) | Strength (MPa) | Withstand voltage in actual vehicle test result |
|---|---|---|---|---|---|
| D-1 | 98 | 37 | 2000 | 350 | ○ |
| D-2 | 90 | 41 | 2200 | 410 | ○ |
| D-3 | 36 | 47 | 3200 | 450 | ○ |
| D-4 | 22 | 50 | 3500 | 470 | ○ |
| D-5 | 53 | 44 | 3800 | 470 | ○ |
| D-6 | 67 | 40 | 2500 | 460 | ○ |
| D-7 | 88 | 35 | 1800 | 380 | ○ |

TABLE 11

| Test Piece No. | Na₂O in Al₂O₃ (%) | Al₂O₃ content (%) | SiO₂ content (%) | CaO content (%) | MgO content (%) | Others' content BaO (%) | ZnO (%) | Citric acid content (ext. %) | pH (-) | Rubber Press performance | Bending Strength of green (MPa) |
|---|---|---|---|---|---|---|---|---|---|---|---|
| 1 | 0.3 | 94 | 2.7 | 1.8 | 0.5 | 0.5 | 0.5 | 0.0 | 10.5 | X | 2.2 |
| 2 | 0.3 | 94 | 2.7 | 1.8 | 0.5 | 0.5 | 0.5 | 0.5 | 9.3 | Δ | 3.3 |
| 3 | 0.3 | 94 | 2.7 | 1.8 | 0.5 | 0.5 | 0.5 | 1.0 | 8.8 | ○ | 5.2 |
| 4 | 0.3 | 94 | 2.7 | 1.8 | 0.5 | 0.5 | 0.5 | 1.5 | 8.1 | ○ | 5.5 |
| 5 | 0.3 | 94 | 2.7 | 1.8 | 0.5 | 0.5 | 0.5 | 2.0 | 7.2 | ○ | 5.3 |
| 6 | 0.3 | 94 | 2.7 | 1.8 | 0.5 | 0.5 | 0.5 | 2.5 | 6.5 | Δ | 3.5 |
| 7 | 0.3 | 94 | 2.7 | 1.8 | 0.5 | 0.5 | 0.5 | 3.0 | 5.9 | X | 2.9 |
| 8 | 0.3 | 94 | 2.7 | 1.8 | 0.5 | 0.5 | 0.5 | 3.5 | 5.2 | X | 2.6 |

TABLE 12

| Test Piece No. | Na₂O in Al₂O₃ (%) | Al₂O₃ content (%) | SiO₂ content (%) | CaO content (%) | MgO content (%) | Others' content BaO (%) | ZnO (%) | Boric acid content (ext. %) | pH (-) | Rubber Press performance | Bending Strength of green (MPa) |
|---|---|---|---|---|---|---|---|---|---|---|---|
| 1 | 0.3 | 93 | 3.2 | 2.3 | 0.5 | 0.5 | 0.5 | 0.0 | 10.7 | X | 2.0 |
| 2 | 0.3 | 93 | 3.2 | 2.3 | 0.5 | 0.5 | 0.5 | 1.0 | 10.1 | X | 3.1 |
| 3 | 0.3 | 93 | 3.2 | 2.3 | 0.5 | 0.5 | 0.5 | 2.0 | 9.4 | Δ | 5.2 |
| 4 | 0.3 | 93 | 3.2 | 2.3 | 0.5 | 0.5 | 0.5 | 3.0 | 8.9 | ○ | 5.6 |
| 5 | 0.3 | 93 | 3.2 | 2.3 | 0.5 | 0.5 | 0.5 | 4.0 | 8.2 | ○ | 5.3 |
| 6 | 0.3 | 93 | 3.2 | 2.3 | 0.5 | 0.5 | 0.5 | 5.0 | 7.6 | ○ | 5.4 |
| 7 | 0.3 | 93 | 3.2 | 2.3 | 0.5 | 0.5 | 0.5 | 6.0 | 7.1 | ○ | 5.2 |
| 8 | 0.3 | 93 | 3.2 | 2.3 | 0.5 | 0.5 | 0.5 | 7.0 | 6.5 | Δ | 3.4 |
| 9 | 0.3 | 93 | 3.2 | 2.3 | 0.5 | 0.5 | 0.5 | 8.0 | 5.8 | X | 2.8 |

What is claimed is:

1. A spark plug comprising:

a metal shell arranged outside a center electrode;

a ground electrode arranged so as to be opposed to the center electrode, an end of the ground electrode being connected to the metal shell; and an insulator, which resides between the center electrode and the metal shell, and which surrounds the outside of the center electrode, wherein the insulator includes Al as a main component in the range of 85 to 98 wt % as a value converted into Al₂O₃ and wherein and further a Na component in the range of 0.07 to 0.5 wt % as a value converted into Na₂O, and insulation resistance that is measured by passing a current through the insulator between a metal terminal and the metal shell while the entire spark plug is held at about 500° C. is 200 MΩ or higher, and wherein the structure of the insulator is constructed of alumina based matrix phase grains of 99 wt % or more in alumina content, as a main phase, and a glassy phase formed in grain boundary regions of the alumina based matrix phase particles and Na component content $WG_{Na}$ present in a glassy phase is in the range of 0.4 to 2 wt %.

2. A spark plug according to claim 1, wherein as raw material of the insulator, alumina powder, whose Na component content is as high as 0.07 to 0.65 wt % as a value converted into $Na_2O$, and in the surface regions of whose particles a Na component in the range of 0.01 to 0.2 wt % as a value converted into $Na_2O$ is included is used.

3. A spark plug comprising:

a metal shell arranged outside a center electrode;

a ground electrode arranged so as to be opposed to the center electrode, an end of the ground electrode being connected to the metal shell; and an insulator, which resides between the center electrode and the metal shell, and which surrounds the outside of the center electrode, wherein the insulator includes alumina as a main component and further a Na component in the range of 0.07 to 0.5 wt % as a value converted into $Na_2O$, and insulation resistance that is measured by passing a current through the insulator between a metal terminal and the metal shell while the entire spark plug is held at about 500° C. is 200 MΩ or higher, and wherein the number of pores each having a size equal to or larger than 10 μm that are observed in a sectional structure of the insulator is equal to or less than 100 as average counts per 1 mm² of the section.

4. A spark plug according to claim 3, wherein the insulator includes an Al component in the range of 95 to 98 wt % as a value converted into $Al_2O_3$.

5. A spark plug according to claim 4, wherein the insulator includes the Na component in the range of 0.07 to 0.5 wt % as a value converted into $Na_2O$ and further includes a K component and a Li component equal to or less than 0.2 wt % in total respectively as values converted into $K_2O$ and $Li_2O$.

6. A spark plug according to claim 5, wherein the insulator includes alkali metal components other than the Na component in total content equal to or less than 0.05 wt % as respective oxides.

7. A spark plug comprising:

a metal shell arranged outside a center electrode;

a ground electrode arranged so as to be opposed to the center electrode, an end of the ground electrode being connected to the metal shell; and an insulator, which resides between the center electrode and the metal shell, and which surrounds the outside of the center electrode, wherein the insulator includes alumina as a main component and further a Na component in the range of 0.07 to 0.5 wt % as a value converted into $Na_2O$, and insulation resistance that is measured by passing a current through the insulator between a metal terminal and the metal shell while the entire spark plug is held at about 500° C. is 200 MΩ or higher, and wherein, the insulator has an insulation withstand voltage of 35 kV/mm or higher at 20° C.

8. A spark plug according to claim 7, wherein the insulator includes an Al component in the range of 95 to 98 wt % as a value converted into $Al_2O_3$.

9. A spark plug according to claim 7, wherein the insulator includes the Na component in the range of 0.07 to 0.5 wt % as a value converted into $Na_2O$ and further includes a K component and a Li component equal to or less than 0.2 wt % in total respectively as values converted into $K_2O$ and $Li_2O$.

10. A spark plug according to claim 9, wherein the insulator includes alkali metal components other than the Na component in total content equal to or less than 0.05 wt % as respective oxides.

11. A spark plug according to claim 7, wherein the insulator includes the Na component in the range of 0.07 to 0.5 wt % as a value converted into $Na_2O$ and further includes one or more selected from the group consisting of Si, Ca, Mg, Ba, Zn and B components at a total content of 60 wt % or more respectively as values converted into $SiO_2$, CaO, MgO, BaO, ZnO and $B_2O_3$ of a remaining weight after excluding a weight as a value converted into $Al_2O_3$ of the Al component from a total weight.

12. A spark plug according to claim 11, wherein the insulator includes one or more selected from the group consisting of Si, Ca and Mg components at a total content of 60 wt % or more respectively as values converted into $SiO_2$, CaO and MgO of a remaining weight after excluding a weight as a value converted into $Al_2O_3$ of the Al component from a total weight.

13. A spark plug according to claim 11, wherein the insulator includes at least one of the Ba component and the B component in the range of 0.2 to 1.2 wt % in total content as oxides.

14. Alumina based insulator for a spark plug, the insulator including a Na component in the range of 0.07 to 0.5. wt % as a value converted into $Na_2O$ and having an insulation withstand voltage of 35 kV/mm or higher at 20° C.

15. Alumina based insulator for a spark plug according to claim 14, the insulator including alumina as a main component and further including the Na component in the range of 0.07 to 0.5 wt % as a value converted into $Na_2O$, wherein the Al component is included in the range of 95 to 98 wt % as a value converted into $Al_2O_3$.

16. Alumina based insulator for a spark plug according to claim 14, the insulator including alumina as a main component, further including the Na component in the range of 0.07 to 0.5 wt % as a value converted into $Na_2O$ and still further including a K component and a Li component in total content equal to or less than 0.2 wt % respectively as values converted into $K_2O$ and $Li_2O$.

17. Alumina based insulator for a spark plug according to claim 14, the insulator including alumina as a main component, further including the Na component in the range of 0.07 to 0.5 wt % as a value converted into $Na_2O$ and still further including one or more selected from the group consisting of Si, Ca, Mg, Ba, Zn and B components at a total content of 60 wt % or more respectively as values converted into $SiO_2$, CaO, MgO, BaO, ZnO and $B_2O_3$ of a remaining weight after excluding a weight as a value converted into $Al_2O_3$ of the Al component from a total weight.

18. Insulator according to claim 14, in whose sectional structure the number of pores each having a size equal to or larger than 10 μm that are observed is equal to or less than 100 as average counts per 1 mm² of the section.

19. Alumina based insulator for a spark plug, the insulator including alumina as a main component and further including the Na component in the range of 0.07 to 0.5 wt % as a value converted into $Na_2O$, wherein the Al component is included in the range of 85 to 98 wt % as a value converted into $Al_2O_3$, wherein a structure of the insulator constructed of an alumina based matrix phase grains of 99 wt % or more in alumina content, as a main phase, and a glassy phase formed in grain boundary regions of the alumina based matrix phase grains in which phase a Na component content $WG_{Na}$ present is in the range of 0.4 to 2 wt %.

20. Insulator according to claim 19, as raw material of which, alumina powder, whose Na component content is as high as 0.07 to 0.65 wt % as a value converted into $Na_2O$, and in the surface regions of whose particles a Na component in the range of 0.01 to 0.2 wt % as a value converted into $Na_2O$ is included is used.

* * * * *